May 19, 1970  R. E. SMITH ET AL  3,512,725
METHOD AND APPARATUS FOR FORMING AND COLLECTING FILAMENTS
Original Filed Dec. 22, 1966  9 Sheets-Sheet 1

INVENTORS
ROY E. SMITH &
BY JEROME P. KLINK

ATTORNEYS

May 19, 1970   R. E. SMITH ET AL   3,512,725
METHOD AND APPARATUS FOR FORMING AND COLLECTING FILAMENTS
Original Filed Dec. 22, 1966   9 Sheets-Sheet 2

INVENTORS
ROY E. SMITH &
BY JEROME P. KLINK

ATTORNEYS

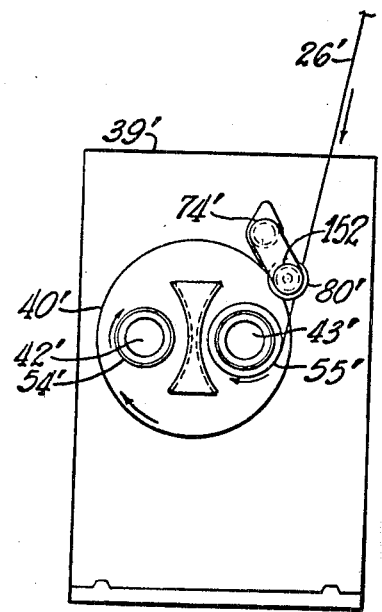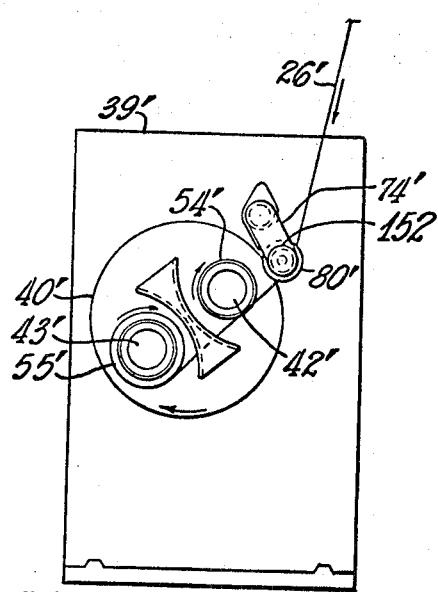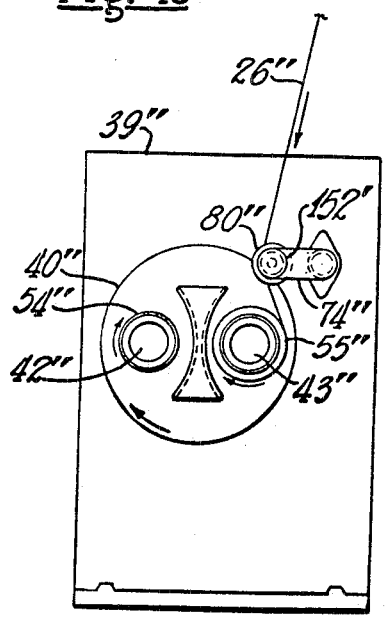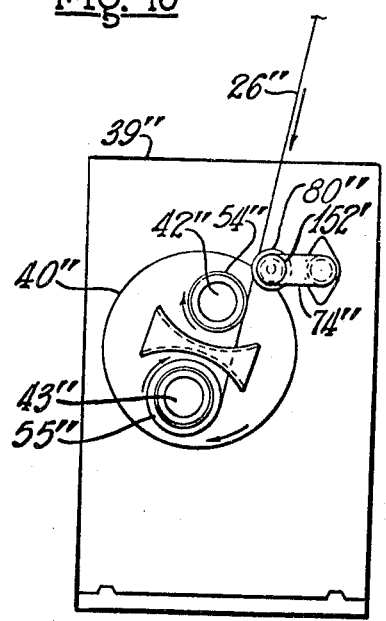

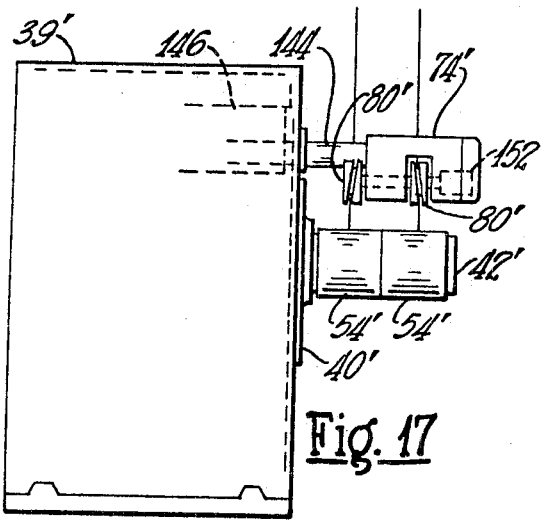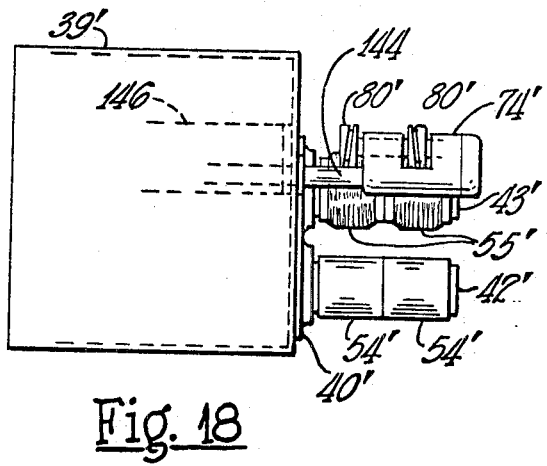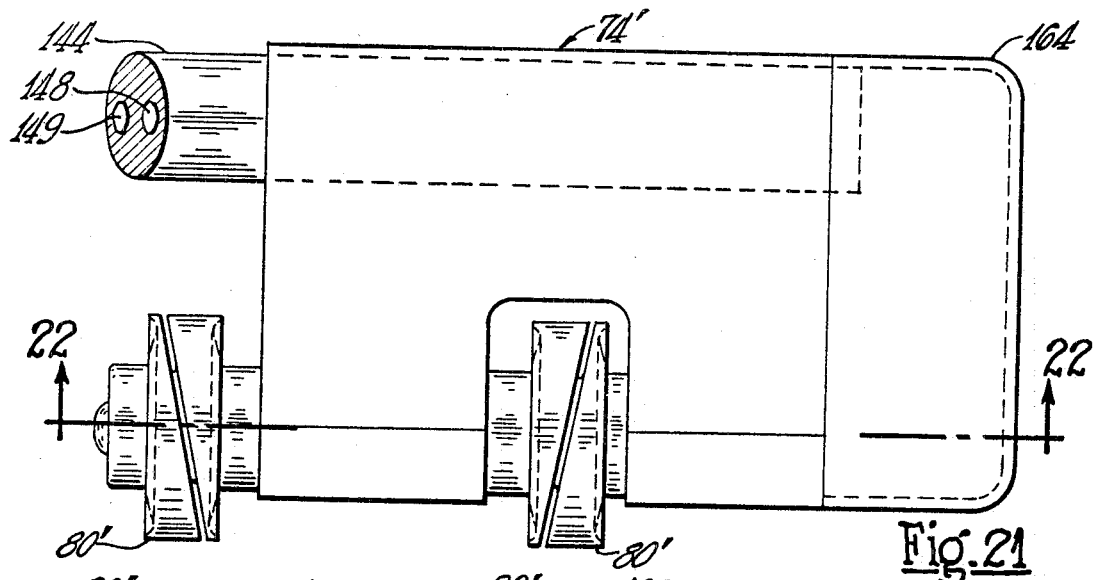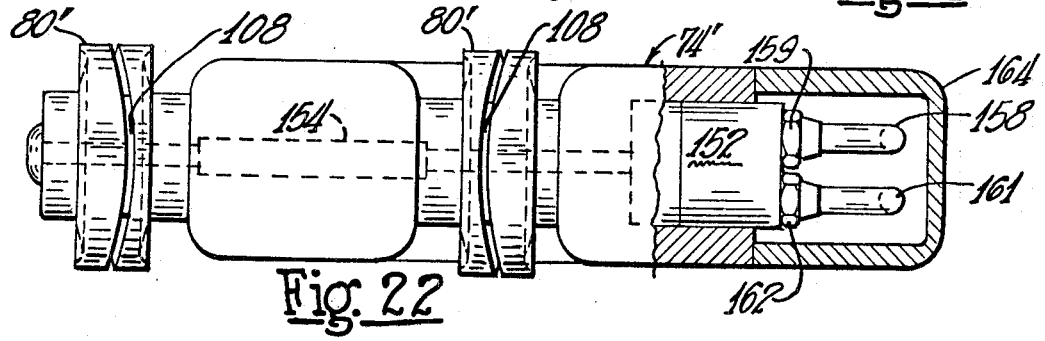

May 19, 1970     R. E. SMITH ET AL     3,512,725
METHOD AND APPARATUS FOR FORMING AND COLLECTING FILAMENTS
Original Filed Dec. 22, 1966     9 Sheets-Sheet 5
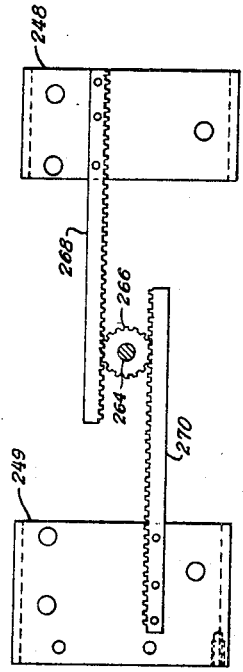
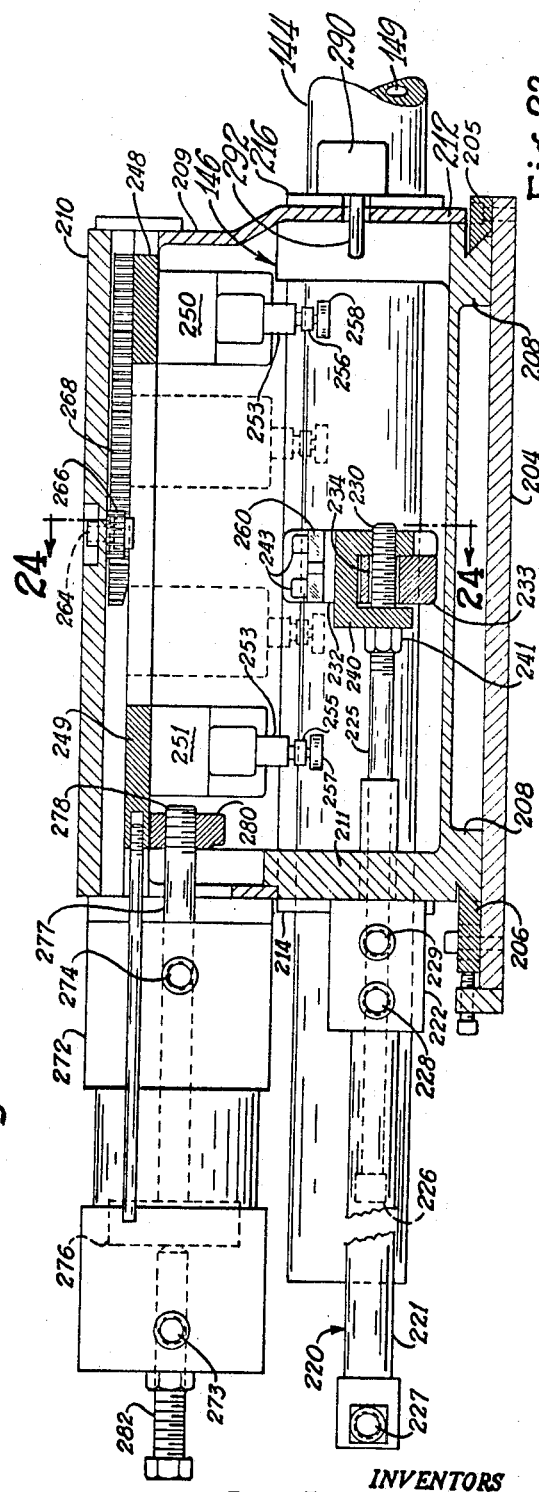
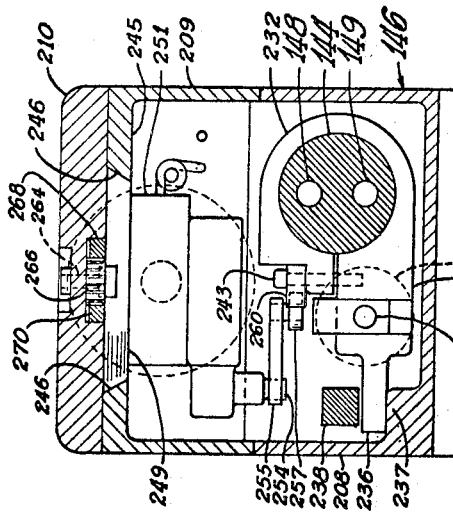
INVENTORS
ROY E. SMITH &
BY JEROME P. KLINK
ATTORNEYS May 19, 1970 R. E. SMITH ET AL 3,512,725
METHOD AND APPARATUS FOR FORMING AND COLLECTING FILAMENTS
Original Filed Dec. 22, 1966 9 Sheets-Sheet 7

INVENTORS
ROY E. SMITH &
BY JEROME P. KLINK

ATTORNEYS

United States Patent Office 3,512,725
Patented May 19, 1970

3,512,725
METHOD AND APPARATUS FOR FORMING AND COLLECTING FILAMENTS
Roy E. Smith, Toledo, and Jerome P. Klink, Newark, Ohio, assignors to Owens-Corning Fiberglas Corporation, a corporation of Delaware
Original application Dec. 22, 1966, Ser. No. 603,857, now Patent No. 3,408,012, dated Oct. 29, 1968. Divided and this application June 17, 1968, Ser. No. 737,682
Int. Cl. B65h 54/02
U.S. Cl. 242—18                                15 Claims

ABSTRACT OF THE DISCLOSURE

A machine for forming and winding continuous filaments upon a rotating collet whereby the collet is driven by a first motor, and a second motor drives a rotatable strand oscillator. The two motors are supplied with current from a generator or alternator whose speed is varied in accordance with the diameter of the package of filaments being wound to progressively reduce the speed of the collet and oscillator while maintaining a proper ratio of collet speed to oscillator speed.

---

This is a division of our copending application Ser. No. 603,857 filed Dec. 22, 1966, now Pat. No. 3,408,012.

This invention relates to method of and apparatus for forming continuous filaments from heat-softened attenuable materials and more especially to a method of and apparatus for automatically and continuously attenuating groups of filaments from streams of heat-softened glass or other heat-softenable material or filament forming resins and collecting strands of the filaments by winding the strand or strands upon collecting means rotating at high speed and, upon completion of a strand package or packages, auotmatically transferring the strand or strands onto empty collecting means and initiating winding of succeeding packages without interruption of attenuation of the filaments.

The present invention embraces a method of forming and collecting a strand of continuous filaments in a package by winding the strand on a rotatable collector while concomitantly traversing the strand on the package by a high speed, high frequency traverse means and wherein at the completion of a strand package, transfer of the strand is effected onto a rotating empty collector wherein two collector supporting collets are successively indexible to winding position and wherein effective control of the strand is maintained during transfer to initiate high frequency oscillation of the strand after transfer of the strand onto an empty collector is completed.

Another object of the invention resides in a method of forming and collecting a strand of continuous filaments in a package by winding the strand on a rotatable collector while concomitantly traversing the strand on the package by a high speed high frequency strand oscillator and wherein at the completion of a strand package the strand is transferred from the completed package to an empty collector while maintaining full control of the path of linear travel of the strand during strand transfer wherein the strand transferring operation is rendered fully automatic without interrupting the linear travel of the strand.

Another object of the invention resides in an arrangement wherein control of the strand during strand transfer operations from a completed package to an empty sleeve is maintained through engagement of the strand with means arranged to facilitate proper tension in the strand and assure automatic transfer of the strand onto an empty collector without interrupting linear travel of the strand.

Another object of the invention resides in a method of winding the strands upon collectors supported by a rotating collet wherein the speed of rotation of the collet is progressively reduced to maintain uniform linear travel of the strands to compensate for the enlarging strand packages and for correlating the speed of high speed strand oscillators whereby a proper crossing or overlapping of individual convolutions or wraps of strands in the packages is maintained throughout the formation of the packages.

Another object of the invention resides in a method and arrangement for correlating the speed of a winding collet and package being wound with a strand oscillating or traversing means through the use of variable speed electrically energizable components under the influence or control of variable frequency generators to assure proper change in speed of the strand oscillating means with the change in speed of the package as it is being formed.

Another object of the invention is the provision of guide means for controlling the strand during transfer of the strand from a completed package to an empty collector embodying a strand engaging surface for holding the strand in strand transfer position adjacent the end of a package until transfer of the strand onto an empty collector is completed.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 15 is a view similar to FIG. 2 illustrating a method of a guide and traverse control of the strand during the formation of a package;

FIG. 16 is a view similar to FIG. 15 illustrating the method of control of the strand by the oscillator during a strand transfer operation;

FIG. 17 is a side elevational view of the winding apparatus shown in FIG. 15;

FIG. 18 is a top plan view of the winding apparatus shown in FIG. 17;

FIG. 19 is a view similar to FIG. 15 illustrating another method of control of the strand by a strand oscillator during the formation of a package;

FIG. 20 is a view similar to FIG. 19 illustrating the method of control of the strand by the oscillator during strand transfer operations;

FIG. 21 is a plan view of the dual oscillator traverse arrangement and carrier for the traverse oscillators;

FIG. 22 is a side view partially in section of the construction shown in FIG. 21;

FIG. 23 is a longitudinal sectional view of a means for controlling reciprocatory movements of the carrier and oscillator traverse means;

FIG. 24 is a transverse sectional view taken substantially on the line 24—24 of FIG. 23;

FIG. 25 is a top plan view of a motion transmitting means shown in FIGS. 23 and 24;

While the method and apparatus of the invention are particularly usable in the formation of wound packages of strands formed of filaments of glass or other heat-softenable material, it is to be understood that the method and apparatus may be utilized to advantage in the collection and packaging of other linear bodies.

Figures 1, 2:
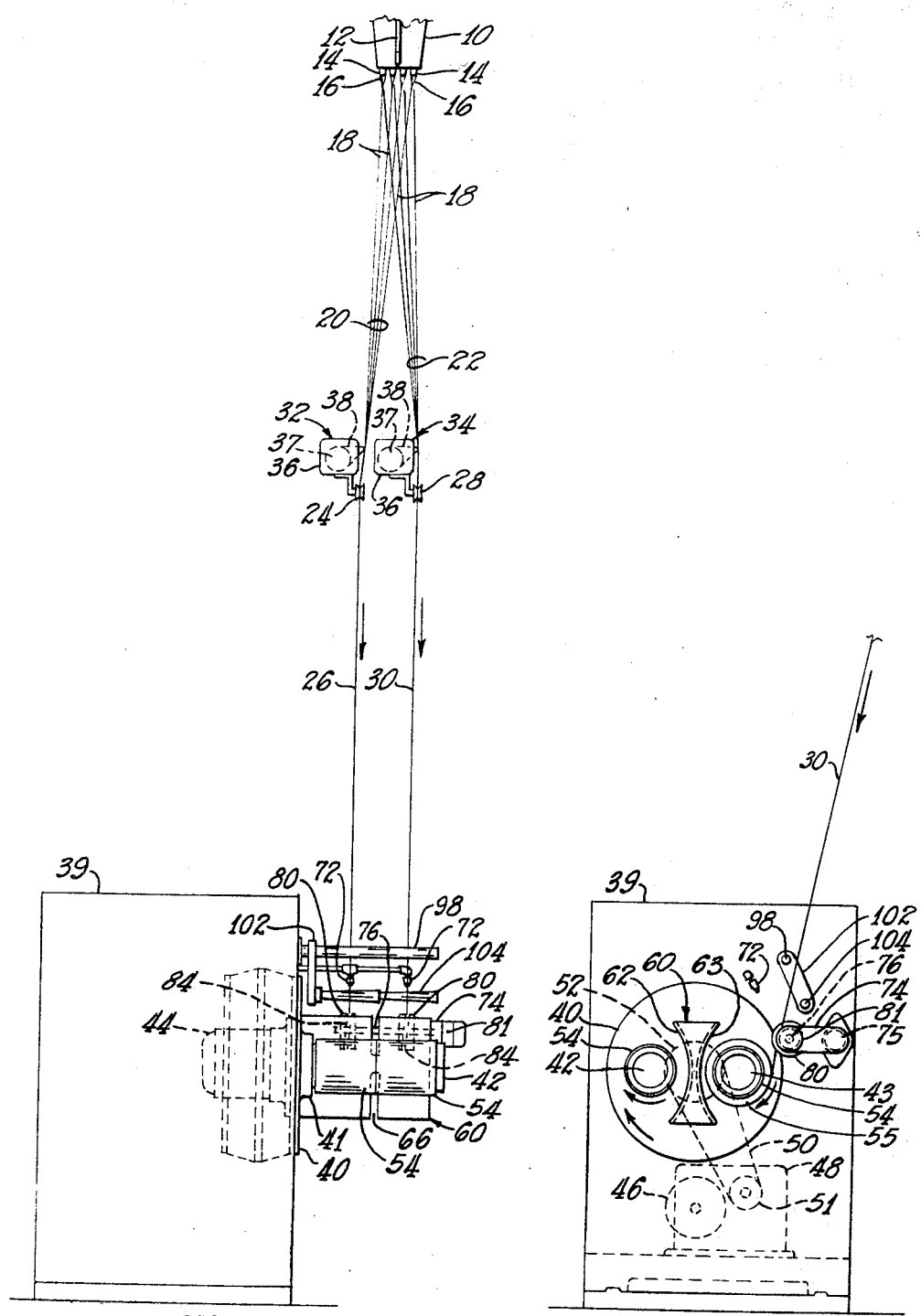
FIG. 1 is a side elevational view illustrating a form of automatic winding apparatus embodying the invention.
FIG. 2 is a front elevational view of the winding apparatus illustrated in FIG. 1.

Referring to the drawings in detail and initially to FIGS. 1 and 2, there is illustrated a conventional type of stream feeder or bushing 10 containing a supply of heat-softened filament-forming material, such as glass, the feeder 10 having a floor provided with a comparatively large number of orificed tips or projections 14 arranged in two groups, each group flowing streams of glass 16 and the streams attenuated to filaments 18 arranged in two groups 20 and 22.

The feeder 10 is formed of an alloy of platinum and rhodium or other material capable of withstanding the intense heat of molten glass.

The feeder is provided with terminals 12, one of which is shown in FIG. 1, connected with a source of electric energy for heating the glass or other material, the energy input being controlled by conventional means (not shown) to maintain the material in the feeder at a proper viscosity to promote the formation of uniform streams 16.

The group of filaments 20 is converged by a gathering shoe or member 24 to form a strand 26, the filaments of the group 22 being converged by a gathering shoe 28 to form a strand 30. The filaments of the respective groups are coated with a lubricant, size or other coating material by means of dual applicator arrangements 32 and 34 of conventional construction, shown in FIG. 1.

Each applicator includes a receptacle 36 in which is journaled a roll 37 immersed in the coating material, an endless belt 38, being driven by the roll 37 acquiring a thin film of the size or coating material which is transferred to the filaments by wiping contact of the filaments with the film of size or coating on the belt.

The strands 26 and 30 are concomitantly wound upon rotatable collectors to form two individual packages of strand in end-to-end relation.

FIGS. 1 and 2 illustrate the automatic winding and package forming apparatus which is inclusive of a housing 39 enclosing the actuating and control components for carrying out or performing the steps in the method of attenuating the filaments and automatically packaging the strands of filaments. Journally supported by means contained within the housing is indexible and rotatable turret or head 40.

The portion of the head 40 at the front of the housing 39 is provided with two hollow boss portions 41 enclosing journal bearings on which are journally supported winding collets 42 and 43. Each of the collets 42 and 43 is individually driven by a motor 44, one of which is illustrated in FIG. 1, the motors 44 being carried by the head or turret 40. The head or turret is indexible to two positions, the collet 43, in FIG. 2 being shown in package winding or forming position while the collet 42 is in a diametrically opposed standby position.

The head 40 is adapted to be indexed in two positions in order to move the completed package away from winding position and an empty collector into winding position for the formation of a new package. The head 40 is rotated by a motor 46 through gear reduction mechanism contained within a housing 48 and through suitable drive means, such as a belt 50 and sprockets 51 and 52. The energization of the motor 46 is controlled by a suitable indexing means of conventional construction timed to index or rotate the head 40 upon the formation of a completed strand package at the winding station.

The collet driving motors 44 are of the variable speed type and are controlled by a method hereinafter described whereby the collet at the winding station is progressively reduced in speed as the strand package increases in size in order to maintain substantially constant the linear travel of the strands 26 and 30 and hence are formation of continuous filaments of uniform size. The purpose of automatically indexing the collets is to successively move completed strand packages away from the winding station and move the other collet and empty collectors into winding or package forming position.

Each of the collets 42 and 43 is adapted to accommodate strand collecting means such as tubular sleeves 54, there being two on each collet arranged in end-to-end relation. Each of the motors 44 for rotating the winding collets and strand collectors carried thereby is of a type in which the speed may be varied for the purpose of progressively reducing the speed of rotation of the collet at the winding station as the strand packages increase in diameter during the winding operation.

The peripheral region of each of the collets 42 and 43 is formed with longitudinally extending recesses in which are disposed bars or friction shoes (not shown) which are resiliently biased radially outwardly of the collets to frictionally grip the strand collectors or tubes to assure rotation of the same with the collets.

Figure 6:
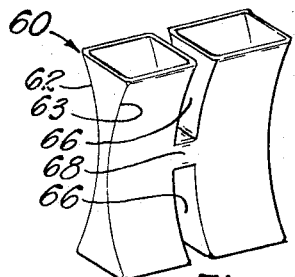
FIG. 6 is an isometric view of a baffle means mounted on the indexing head between the collector driving collets.

Disposed between the winding collets 42 and 43 and fixedly mounted by the head 40 is a baffle means 60, particularly shown in FIGS. 1, 2 and 6, which is of hourglass shape in cross-section defined by concave surfaces 62 and 63.

The baffle means is preferably of thin walled hollow configuration, as illustrated in FIG. 6, the central region being provided with slots 66 to accommodate the strand 26 during indexing operations in moving completed packages away from winding position and empty collectors or tubes into winding position. The regions of the baffles adjacent the slots are joined by a connecting bridge 68. The curved surfaces 62 and 63 of the baffle means 60 are disposed between the collets to confine water sprayed from spray nozzles 72 onto the strand oscillators in the region of the strand packages being formed.

The winding apparatus includes strand traverse means for distributing the strands lengthwise of the packages and for oscillating the strand during traverse of the strand lengthwise of the packages in order to effect crossing of individual convolutions or wraps of the strands as they are collected on the packages.

In the embodiment illustrated, a strand oscillator carrier 74 is supported by a reciprocable shaft 75 which extends into the housing 39. The shaft 75 is reciprocated by conventional means, shown in Pat. 3,109,602, in which successive reciprocations of the carrier are progressively reduced in length to build strand packages of generally uniform thickness with tapered ends to prevent sloughing of the strand at the ends of the packages.

Journally supported upon the carrier 74 is a pair of strand oscillators or strand guide means 80 mounted upon a shaft 76 supported in suitable bearings mounted by the carrier 74 which are driven by a variable speed electrically energizable motor 81 for guiding and traversing the strands as they are collected upon the collectors or tubes 54 at the winding station. As the strands 26 and 30 travel at comparatively high linear speeds of upwards of fifteen thousand feet or more per minute, the strand oscillators 80 are rotated at comparatively high speeds to effect high frequency oscillation of the strands to effect a crossing of individual convolutions or wraps of strand on a collector.

Figure 9:
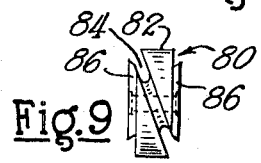
FIG. 9 is an elevational view of a strand oscillator and control means.
Figure 10:
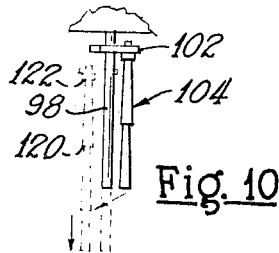
FIG. 10 is a top plan view of the arrangement shown in FIG. 7 illustrating the path of movement of a strand control means for moving the strand to a transfer position.
Figure 11:
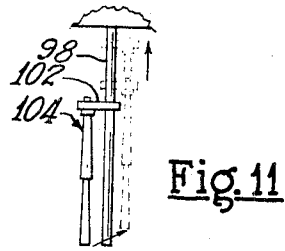
FIG. 11 is a view similar to FIG. 10 illustrating the strand control means in strand transferring position.

FIG. 9 illustrates one form of oscillator 80. In this form, the oscillator body 82 is of cylindrical shape and is preferably formed of phenolic resin reinforced with laminations of cloth, such material being commercially known as Westinghouse Micarta grade 286. The body 82 is fashioned with an angularly disposed peripheral recess or groove 84 adapted to accommodate and guide the strand. Integrally formed at each side of the cylindrical body 82 is a frusto-conically shaped shoulder or ledge 86 to facilitate re-entry of the strand into the traverse groove 84 after transfer of the strand from a completed package onto an empty tube or collector has been effected as hereinafter described.

Figures 13, 14:
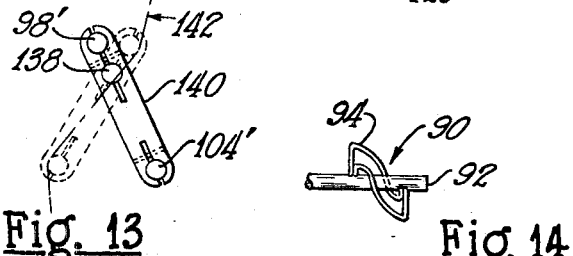
FIG. 13 is a front elevational view of a modified arrangement of strand control for strand transfer operations.
FIG. 14 is an elevational view illustrating another form of strand oscillator.

FIG. 14 illustrates another form of strand guide or oscillator 90 which includes a supporting shaft 92 and a strand engaging portion 94, the latter being formed of wire into the configuration illustrated in FIG. 14. The strand-engaging wire component 94 is of conventional character and, when rotated at high speed, effects a high frequency oscillation of the strand. The strand oscillator 80, illustrated in FIG. 9, or the strand oscillator 90, illustrated in FIG. 14, may be used as a strand oscillating and guide means in the winding apparatus illustrated in FIGS. 1 and 2.

The arrangement illustrated in FIGS. 1 and 2 is inclusive of means to maintain positive control of the strands during transfer of the strands from completed packages onto empty collectors at the winding station. In the arrangement shown in FIGS. 1 and 2, the strands are disengaged from the oscillators at the completion of packages and are moved or diverted to the regions of the collectors at the ends of the respective packages just prior to transfer of the strands onto the empty collectors.

Figure 8:
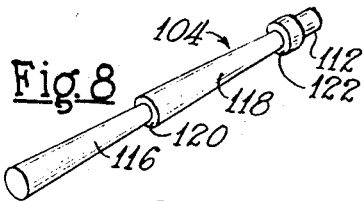
FIG. 8 is an isometric view of strand engaging means for controlling a strand during strand transfer operations, the means forming a component of the construction shown in FIG. 7.

The strand control means for effecting strand transfer is inclusive of a shaft 98 which extends into the housing 39 and is reciprocated by conventional means, shown in Pat. 3,109,602, disposed within the housing in timed relation with the indexing of the collet supporting head or turret 40. Fixedly secured to the shaft or member 98 is an arm or member 102 and secured to the distal end of the arm 102 is a strand control or strand hold off means or member 104. One form of member 104 is illustrated in detail in FIG. 8.

Figure 7:
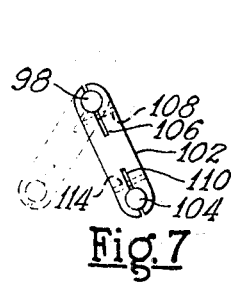
FIG. 7 is an end view of the strand transfer control means of the character shown in FIGS. 3 through 5.

With particular reference to FIG. 7, it will be seen that one end region of the arm 102 is provided with a slot or kerf 106 and a circular opening, the latter accommodating the shaft or member 98, a threaded member or screw 108 being adapted to clamp the furcations defined by the slot into securing engagement with the shaft or member 98. The opposite or distal end of the member 102 is likewise fashioned with a kerf or slot 110 and a circular opening accommodating the strand control means 104, the furcations defined by the kerf 110 being drawn into securing engagement with a tenon portion 112 or member 104 by a screw 114.

The strand control member 104 is fashioned with two tapered portions 116 and 118, the juncture of the portions forming a circular abutment or shoulder 120. The region of reduced diameter of tapered portion 118 terminates in a circular abutment or shoulder 122. The shaft 98, in addition to being arranged for reciprocation at the time of indexing of the head 40, is adapted to be rotated through a partial revolution from a position shown in full lines in FIG. 7 to the position shown in broken lines to effect disengagement of the strands from the oscillators 80.

In effecting transfer of the strands from completed packages onto empty collectors, it is desirable that each strand be transferred to an end region of the adjacent collector in order to render the strand end readily accessible for future processing.

The member 104 functions to disengage the strands from the oscillators 80 and transfers the strands to the end regions of the collectors at the time of transfer of the strands from completed packages to empty collectors and to maintain effective control of the strands when the latter are disengaged from the oscillators.

FIGS. 3, 4, 5, 10 and 11 illustrate, in semi-schematic form, the method steps involved in the strand transferring operations. FIGS. 1 and 2 illustrate the normal travel of the strands in engagement with the traverse oscillators 80 during formation of strand packages 55 at the winding station. During winding operations, the shaft 98, arm 102 and member 104 occupy the relative positions illustrated in full lines in FIGS. 2 and 10. Just prior to indexing the turret or head 40, rotation of the standby collet 42 is automatically initiated to bring the peripheral speed of the standby package collectors on the collet 42 to approximately the linear speed of the strands.

Figure 3:
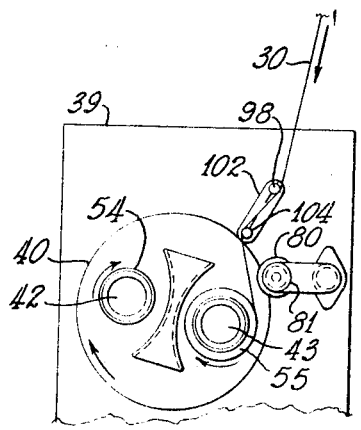
FIG. 3 is a schematic view illustrating the method step of collecting or winding linear materials to form a package, the package being shown a substantially completed.

The shaft 98 is first rotated from the position shown in full lines in FIG. 7 to the position shown in broken lines in FIG. 7 and in full lines in FIG. 3, the strands 26 and 30 engaging the shaft 98 and the bar or member 104 to guide the strand in the path illustrated in FIG. 3 and disengage the strands from the oscillators 80. After the partial rotation of shaft 98 and member 104 takes place, the shaft or member 98 and member 104 are moved lengthwise to the broken line positions illustrated in FIG. 10.

With the completion of the rotative movement of shaft 98, the strands 26 and 30 are engaged with the tapered portions 116 and 118 and are disengaged from the oscillators 80. During this lengthwise movement, the strands are engaged by the shoulders 120 and 122 and are concomitantly moved into registration with the respective end regions of the collectors or tubes 54 bearing the completed packages 55. This action completes the positioning of the rapidly moving strands at the end regions of the collectors and winding of the strand continues on these regions of the collectors of the completed packages.

Figure 4:
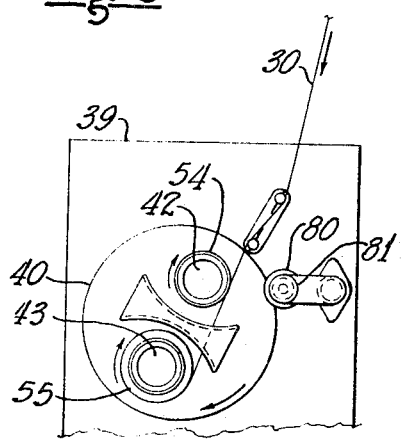
FIG. 4 is a view similar to FIG. 3 illustrating an indexing movement of the collet supporting head wherein the completed package is being moved away from the winding station and an empty collector being moved toward the winding station.
Figure 5:
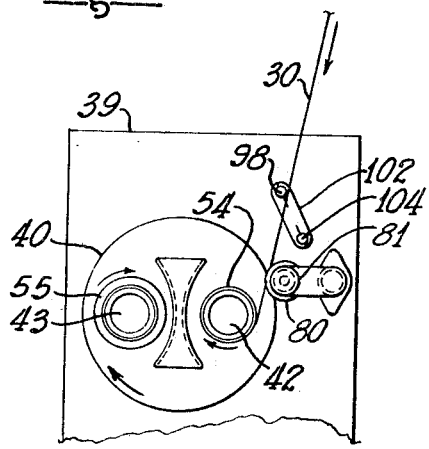
FIG. 5 is a view similar to FIG. 4 illustrating the transfer of the strand onto an empty collector.

The head 40 is then automatically indexed to move the completed packages 55 away from winding position and the standby collet 42 and its collectors toward the winding station, the relative positions of these components during an indexing operation being illustrated in FIG. 4, the head 40 being in an intermediate position. The head 40 continues its indexing movement in a clockwise direction to the position illustrated in FIG. 5 with the collet 42 and its collector 54 at the winding station in position to effect collection of the strands on the empty collectors 54.

During the indexing movement of the head 40, the completed package 55 is rapidly reduced in speed and the peripheral speed of the collector 54 on collet 42 is rotating at a peripheral speed substantially equal to the linear speed of the strands.

As the speed of the completed packages 55 is reduced, loops are formed in the strands between the completed packages and the empty collectors whereby the strands of the loops adhere or lick to the surfaces of the empty collectors 54 and are snubbed by successive turns or wraps of the strands.

This action of initiating winding of the strands onto the empty collectors fractures the strands between completed packages and the empty collectors so that winding of the strands on the empty collectors continues at the end or transfer regions of the empty collectors. When the head 40 is fully indexed to the position shown in FIG. 5, the strands are being wound upon the end regions of the empty collectors 54. At this period in the operation, the shaft 98 is partially rotated in the opposite direction to move or swing the member 104 to the position shown in FIG. 5 and indicated by broken lines in FIG. 11 out of engagement with the strands 26 and 30.

When the member 104 moves out of engagement with the strands, they are re-engaged in the grooves 84 of the oscillators 80, being guided therein by the frusto-conically shaped regions 86, shown in FIG. 9. The shaft 98 is then retracted lengthwise to return the member 104 from the broken line position, shown in FIG. 11, to the full line position, shown in FIG. 10. This action restores control of the strands to the traverse oscillators 80 and traverse of the strand continues in a normal manner in forming packages on the collectors 54 carried by the collet 42 at the winding station.

In order to maintain a substantially constant linear speed of the strands, it is essential during formation of the strand packages to modulate the speed of the collet and collectors upon which packages are being formed so as to progressively reduce the collet speed as the strand packages enlarge in diameter and to progressively reduce the speed of rotation of the strand oscillators 80 at a substantially fixed ratio with respect to the speed of the collet in order to attain or effect a proper crossing of the convolutions or wraps of strands as they are collected in the packages.

Figure 12:
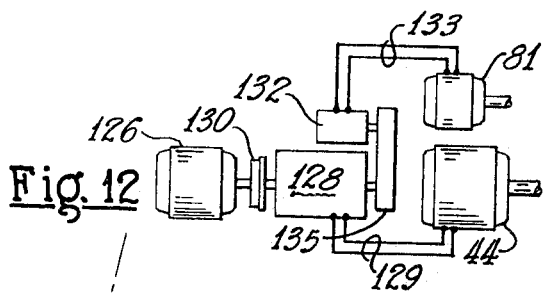
FIG. 12 is a schematic view illustrating a method and means for concomitantly rotating a strand collector and strand traverse oscillator for varying the respective speeds thereof.

FIG. 12 is a schematic illustration of an arrangement for modulating the respective speeds of the drive motors 44 for the winding collets when in winding position and the motor 81 rotating oscillators 80. The motors 44 for driving the collets 42 and 43 and the motor 81 for rotating the oscillator 80 are of a type wherein the speed may be varied by varying the frequency of the input current.

In the arrangement shown in FIG. 12, a motor 126 of the constant speed type, such as a synchronous motor, is arranged to drive a high frequency alternator or generator 128 through the medium of a magnetic coupling arrangement schematically illustrated at 130. The coupling 130 is of the slip type and is controlled by conventional means of the character shown in Pat. 3,109,602, to progressively reduce the speed of the alternator 128 during the formation of strand packages.

The output frequency of the generator or alternator 128 is progressively reduced, and current conveyed by conductors 129 to the motor 44 modulates or progressively reduces the speed of the motor and the collet at the winding station as the strand packages increase in size.

A second alternator or generator 132 is connected by conductors 133 with the oscillator drive motor 81. A suitable drive arrangement, schematically illustrated at 135, is arranged between the alternator 128 and the alternator 132 whereby both alternators are simultaneously driven at different speeds, but in a constant ratio through the drive arrangement 135.

The alternator 132 is also of the varying frequency type and as its speed is reduced through its drive arrangement 135, the frequency of the alternator 132 is progressively reduced whereby the speed of the oscillator drive motor 81 is progressively reduced so as to effect the proper crossing of convolutions or wraps of strands on the packages as the packages increase in size. The varying voltage of the alternators 128 and 132 may be utilized in lieu of the varying frequency for varying the speeds of the motors 44 and 81.

As a variation in the method of varying the speed of the strand oscillator, the winding collet and oscillator may be varied in speed by the output of the single variable frequency generator 128. This may be accomplished by driving the oscillator drive motor 81 direct from the output of the variable frequency generator or alternator 128. In such arrangement, the strand oscillator is driven from the shaft of motor 81 through a timing belt drive of conventional construction to provide a proper ratio of collet speed to the oscillator speed.

FIG. 13 illustrates a modified form of strand guide and control means for use in effecting transfer of strands from completed packages onto empty sleeves. In this form a shaft 138 is provided with an arm 140, the shaft 138 being reciprocable in the manner of the shaft 98 hereinbefore described.

Secured in an opening in the upper end region of the arm 140 is a strand engaging bar or member 98'. Secured in an opening in the lower end of the arm 140 is a strand engaging hold off bar 104'.

In this form, the region of connection of the arm 140 with its supporting shaft 138 is between the region of mounting of the members 98' and 104' on the arm 140. The operation of the arrangement shown in FIG. 13 in effecting transfer of strands from completed packages onto empty collectors is the same as the strand transfer operations shown in FIGS. 3, 4 and 5 and hereinbefore described. The path of a strand in strand transfer position is indicated by the broken line 142 when the arm 140 and the members 95' and 104' are in strand transfer position to disengage the strands from the oscillators 80.

FIGS. 15 through 18 illustrate in semi-schematic form a method and means for effecting transfer of strands from completed packages onto empty collector sleeves at the winding station while maintaining control of the strands by the oscillators 80'. The arrangement and circuits and control components for accomplishing control of the strands are illustrated in FIGS. 23 through 29 and hereinafter described. In this form, strands 26' engage with oscillators 80' supported upon a reciprocable carrier 74', the oscillators being driven by a motor 152. The carrier is reciprocable by means illustrated in FIG. 23 and hereinafter described. The indexible head 40' is provided with collets 42' and 43', FIG. 15 illustrating substantially completed strand packages 55' at the winding station.

FIG. 16 illustrates the path of the strands during transfer of the strands from completed packages 55' to empty collectors 54', the latter mounted on the collet 42'. In this method, the strands are maintained at all times in engagement with the strand oscillators 80'. FIG. 16 illustrates the indexible head 40' moved through a partial indexing rotation showing the strands in engagement with the empty collectors 54' and the oscillators 80'.

Upon completion of strand packages 55' at the winding station, shown in FIG. 15, the motor 152 for driving the oscillators 80' preferably ceases rotation as hereinafter described and the carrier 74 moved to its outermost position with the strands adjacent an end region of each of the completed packages 55'. By interrupting rotation of the strand oscillators 80' during strand transfer operations, the strands are advanced in defined linear paths without oscillation at the transfer region.

Upon further movement of the indexing head 40' in a clockwise direction as viewed in FIG. 16 from the position shown therein conventional braking means hereinafter described is applied to the collet 43' supporting the completed packages 55' to reduce its speed so that a loop of strand is formed between each completed package and an empty collector 54' whereby the strands, without interruption of their linear travel, adhere to the empty collectors 54' and are snubbed thereon. The strands are fractured by this action and winding initiated on the end regions of the collectors 54' while the oscillators are in a nonrotating condition.

After winding has begun on the empty collectors 54', rotation of the oscillator drive motor 152 is initiated and traverse and oscillation of the strands thereafter continued in the normal manner as packages of strand are being formed on the collectors 54' mounted on the collet 42'. The strands are guided during both traverse operations and strand transfer operations by the oscillators 80' as engagement of the strands with the oscillators is continuously maintained.

FIGS. 19 and 20 illustrate another method of strand control during package winding and strand transferring operations from completed packages onto empty collectors. The housing 39'' journally supports an indexible head 40'' on which is mounted collets 42'' and 43'', the latter being illustrated as supporting nearly completed strand packages 55''. The strand control means includes the carrier 74'' journally supporting oscillators 80''. The oscillators 80'' are rotated by a motor 152'.

In this method of strand control, the strands 26'' are in engagement with the oscillators 80'' at the left side of the axis of rotation of the oscillators. FIG. 19 illustrates the position of the oscillators with respect to the package 55'' being formed at the winding station preparatory to an indexing movement of the head 40''.

FIG. 20 illustrates the indexible head 40'' and components carried thereby in a partially indexed position wherein the strands 26'' are engaged with the oscillators 80'' and with empty collectors 54'' on the collet 42'' which are being moved into winding position concomitantly with the movement of the completed packages 55'' away from the winding station.

At the completion of the packages 55'' and just prior to the indexing movement of the head 40'', the oscillator drive motor 152' may be deactivated to interrupt rotation of the oscillator, and the oscillator carrier 74'' moved lengthwise to its outermost or strand transfer position as hereinafter described.

Thus, during strand transfer, the strands are maintained in engaging relation with the oscillators 80'' whereby the strands are transferred onto the empty collectors 54'' without oscillation by reason of the nonrotating condition of the oscillators 80''. After an indexing movement of head 40'' is completed and the collet 42'' and empty collectors 54'' are moved into the winding station, rotation of the oscillator drive motor 152' is automatically initiated as hereinafter described to effect rotation of the oscillators 80'' and restore normal reciprocation of the oscillator carrier 74'' to form packages of strand on the empty collectors 54'' in the normal manner.

In the arrangement and method illustrated in FIGS. 19 and 20, the strands are always under the influence and control of the oscillators 80'' not only during normal winding and strand traversing operations but in strand transfer position. The collet 43'' carrying the completed packages 55'' is reduced in speed as it moves away from the winding station to form strand loops between the packages and the empty collectors whereby the strands are snubbed onto the empty collectors and the strands fractured adjacent the completed packages to initiate the formation of strand packages upon the empty collectors without interruption of the advancing strands 26''.

Figure 26:
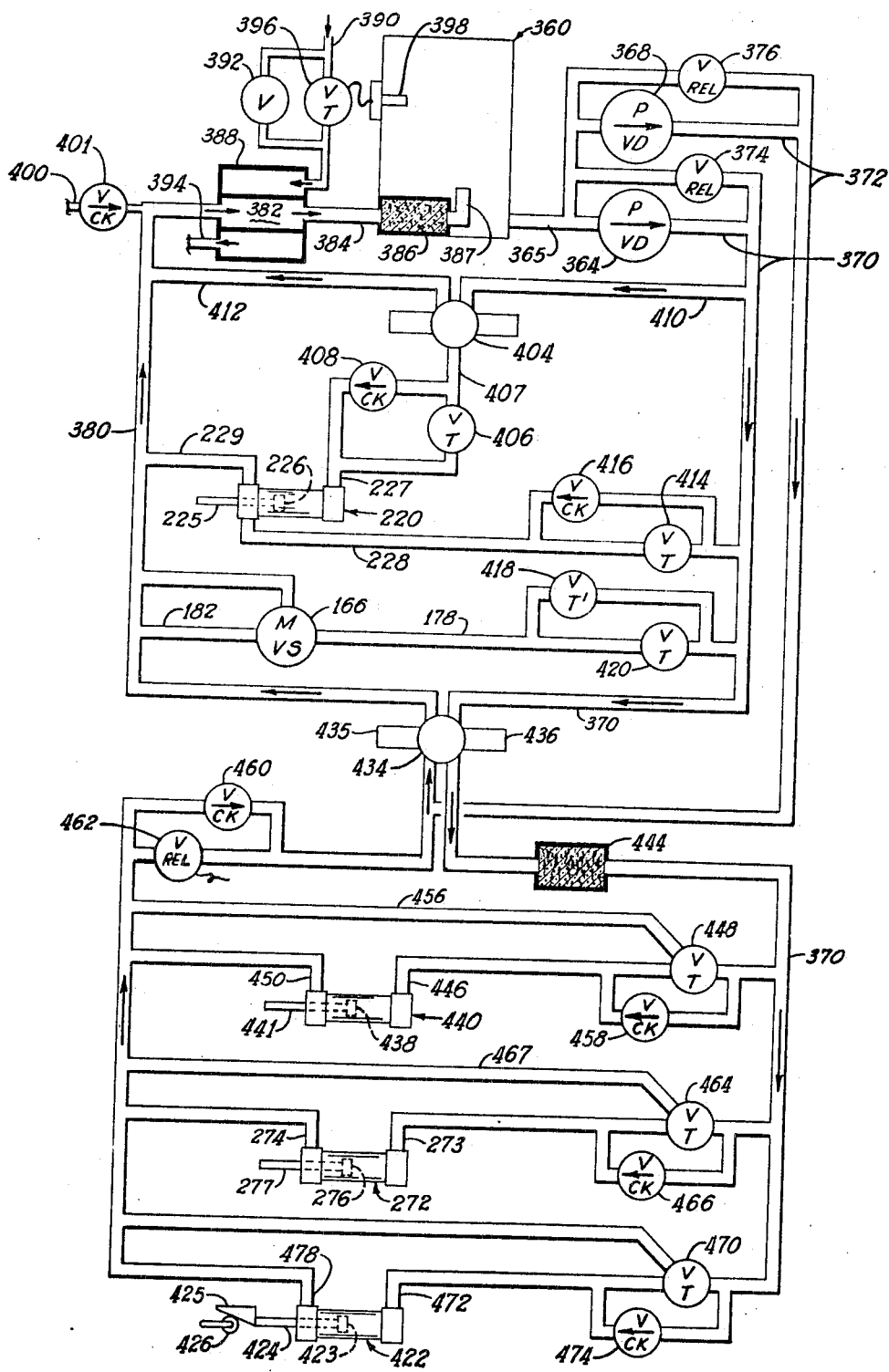
FIG. 26 is a schematic view of hydraulic circuits for actuating components of the automatic winding apparatus.
Figure 27:
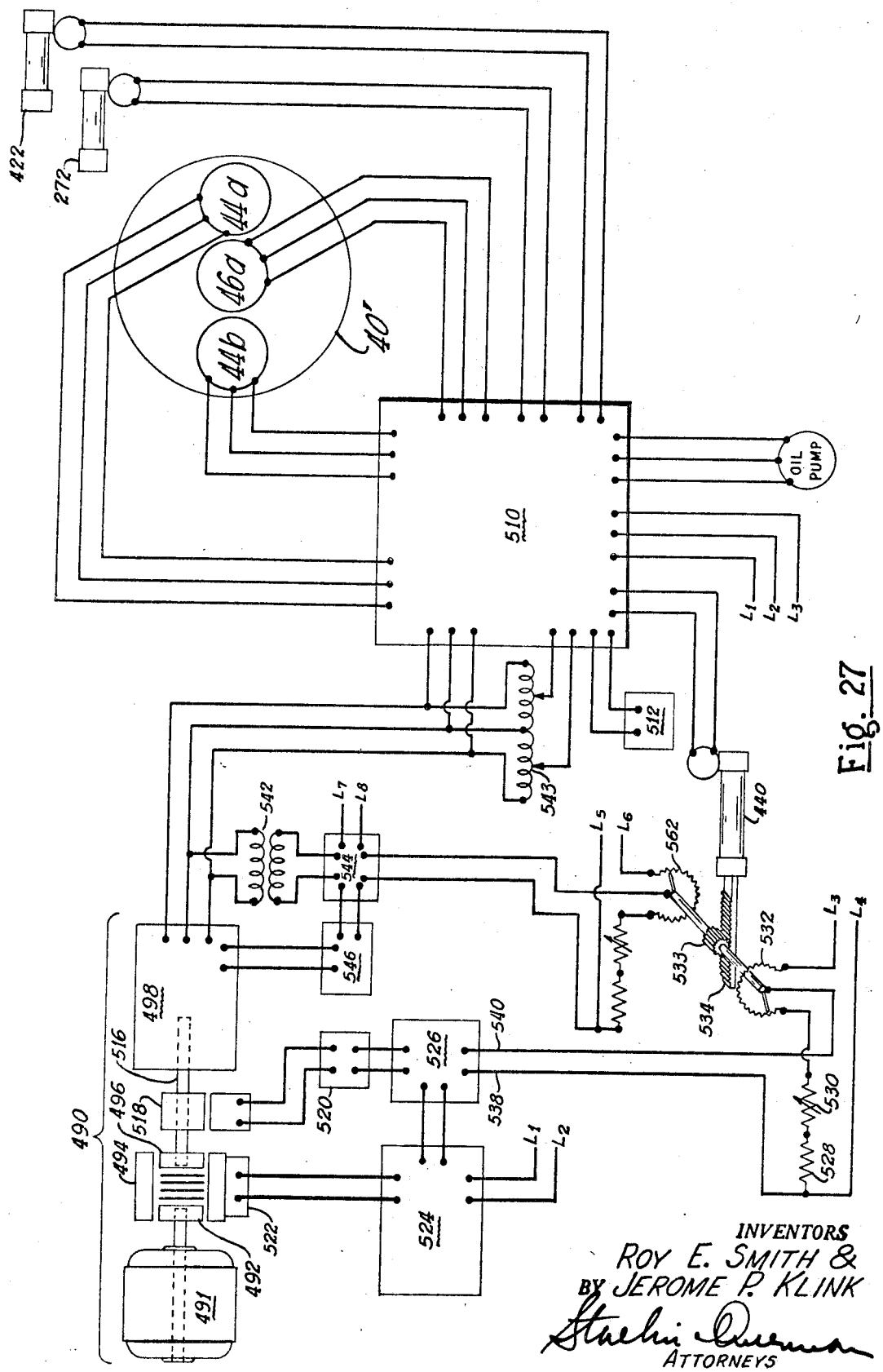
FIGS. 27, 28 and 29 are schematic diagrams of circuits and electrically actuated and controlled components for performing the steps of the method of strand winding and package formation illustrated in FIGS. 15 through 25.
Figure 28:
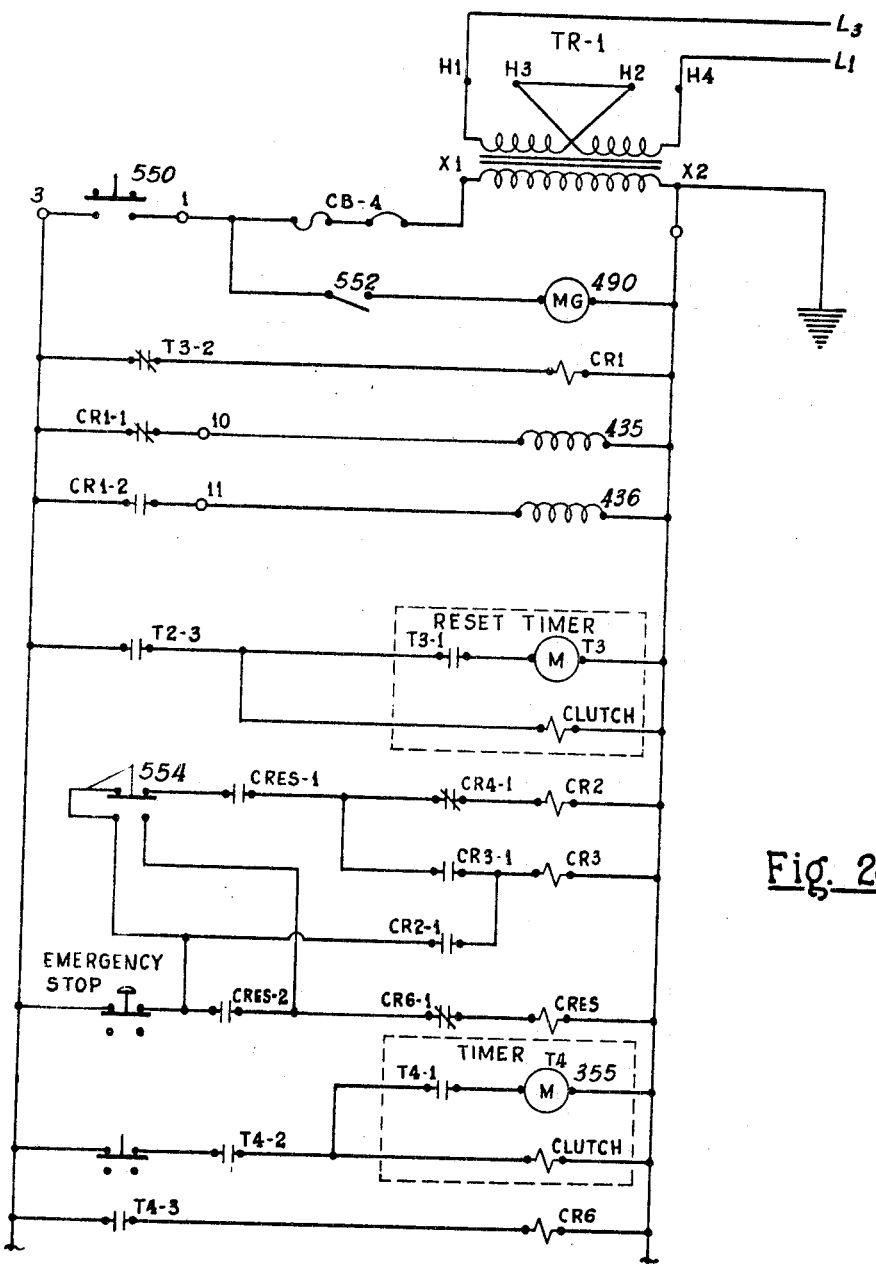
Figure 29:
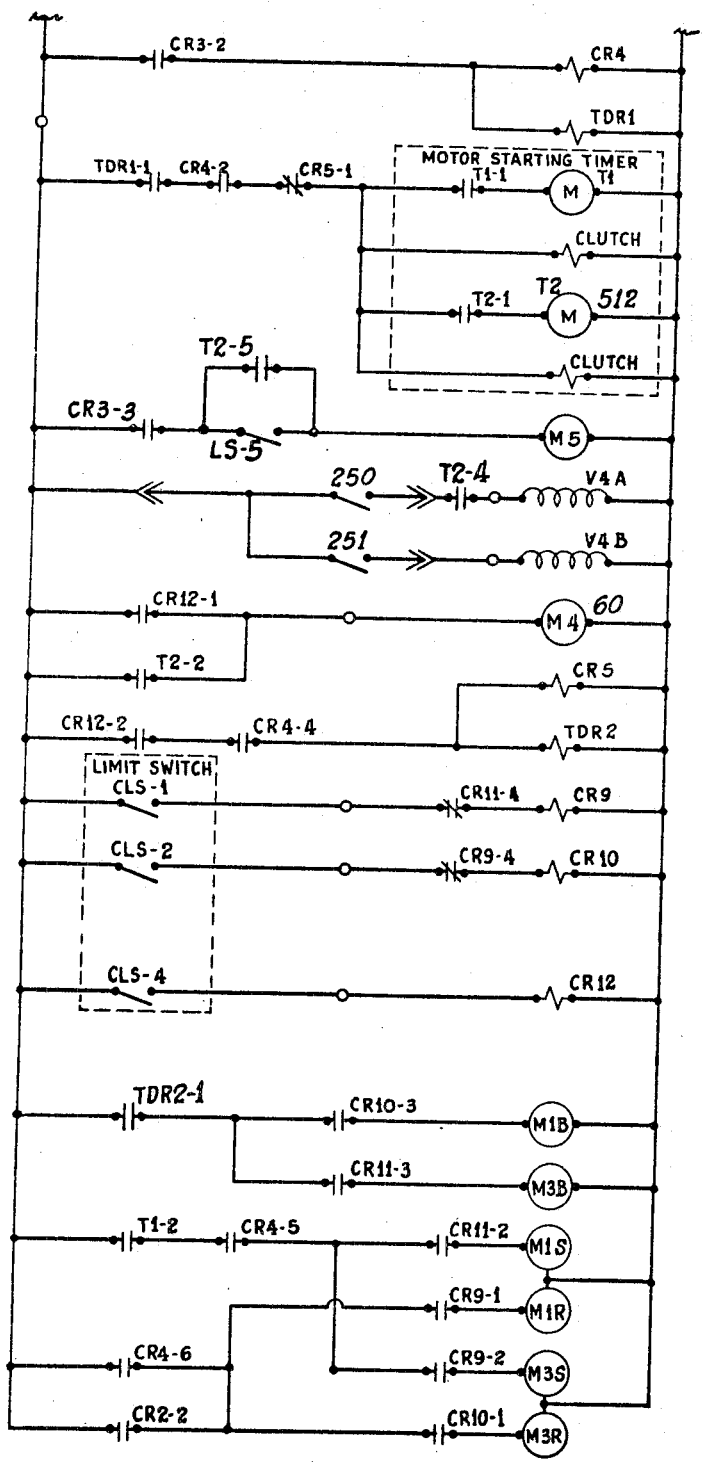

The carrier 74', the traverse oscillators 80' and the motor 152 for rotating the oscillators are illustrated in FIGS. 21 and 22. The means supporting and actuating the carrier 74' are illustrated in FIGS. 23 through 25. The hydraulic circuits for actuating components of the winding apparatus illustrated in FIGS. 15 through 18 are shown in FIG. 26, and the circuits and electrically actuated and controlled components are illustrated in FIGS. 27 through 29.

The traverse oscillator carrier 74' is mounted upon a cylindrically shaped supporting shaft or member 144. As shown in FIG. 23, the member 144 is supported by a supplemental frame 146 and is reciprocably or slidably mounted in suitable bearings carried by the supplemental frame 146. As hereinafter explained, the cylindrically shaped member 144 is controlled to reciprocate through progressively reduced distances providing the builder motion for distributing the strand lengthwise of the collector sleeves and concomitantly form the tapered end regions of strand in the packages and move the carrier 74' and oscillators 80' to strand transferring positions at the completion of package forming operations.

The cylindrically shaped member 144 is formed with interior lengthwise channels 148 and 149 for conveying liquid, such as oil or other fluid, to and from a hydraulically operated motive means or motor 152 for rotating the traverse oscillators 80'. The oscillators 80' are mounted on a shaft 154 journaled in suitable bearings in the carrier 74', the shaft being driven by the motor 152.

The end of duct 148 in the bar 144 is connected by a tube 158 and fitting 159 with the motor 152 to convey oil under high pressure to the motor. The oil return channel 149 at the end of the bar 144 is connected by a tube 161 and fitting 162 with the motor 166 to convey spent fluid or oil away from the motor. The tubes and fittings are enclosed by a cover plate 164 shown in FIGS. 21 and 22. The hydraulically actuated motor 152 is adapted to rotate the traverse oscillators 80' at high speeds.

The traverse carrier 74' is reciprocated concomitantly with the high speed rotation of the oscillators 80' in order to distribute the strands lengthwise of the collector sleeves or tubes. FIGS. 23 through 25 illustrate an arrangement for reciprocating the bar 144 and the carrier 74'. The arrangement shown is inclusive of means for progressively decreasing the lengths of the reciprocating strokes of the bar 144 and carrier 74' in order to build packages of strand having tapered ends.

The mechanism for accomplishing this purpose is carried by the housing 146 disposed in the position shown in FIG. 17. As particularly shown in FIG. 23, the housing 146 is supported upon a plate 204 mounted in the housing 39' of the winding apparatus. The housing 146 is removably secured to the frame plate 204 by means of bars 205 and 206. The housing 146 includes a lower section 208, an intermediate section 209 and a cover member 210 as shown in FIG. 24.

The end walls 211 and 212 are bored to accommodate bushings or bearings 214 and 216 in which the shaft 144 is supported for slidable movement. The shaft or bar 144 is reciprocated by a hydraulic actuator 220 which is inclusive of a cylinder 221 having a portion 222 secured to the housing section 208. A piston 226 connected with the piston rod 225 is reciprocable in the cylinder 220.

The respective ends of the cylinder 221 are provided with fittings connected with two tubes 227 and 228 which are connected through valve means with the supply of oil or other fluid under pressure for reciprocating the piston and piston rod. The portion 222 of the cylinder is provided with a tube 229 forming a drain to dispose of any leakage of fluid that may occur past the seals in the cylinder. Surrounding the bar or rod 144 is a C-shaped clamping member 232, one leg 233 of the clamp member being formed with an opening 234 through which extends a threaded portion 227 formed on the piston rod 225.

The portion 233 of the clamp 232 has a projecting lug or extension 236 slidable between a boss portion 237 on the housing section 208 and a guide bar or abutment 238 arranged in parallelism with the upper surface of the boss 237. The boss 237 and the bar 238 form a guide means to maintain the bar 144 and the oscillator carrier 74' against rotation and for longitudinal movement in parallelism with the axes of the winding collets.

A U-shaped member 240 straddles the portion 233 of the clamp as shown in FIG. 6 and is formed with a threaded opening to accommodate the threaded portion 227 of the piston rod 225, the member 240 being locked to the piston rod by a nut 241. Through this arrangement the movement of the piston rod 225 effects longitudinal movement of the bar or rod 144. The clamp 232 is drawn into securing engagement with the member 144 by clamping screws 243.

The clamp 232 may be adjusted to position the member 116 in order to properly position the traverse carrier 74' and the oscillators in proper relation to the collectors at the winding station. A flow control valve 406, shown schematically in FIG. 26, is connected with the pressure fluid supply tubes 227 and 228 to meter the oil flowing out of the actuator 220 so as to control the rate of longitudinal movement of the piston rod 225 and the traverse supporting bar 144.

A solenoid operated direction control valve 404, shown in FIG. 26, is arranged to be actuated and controlled by two limit switches which are alternately actuated by means carried by the clamp member 232. With particular reference to FIGS. 23 and 24, an upper wall 245 of the intermediate housing section 209 is formed with a lengthwise extending dovetail configuration 246 forming ways in which plates 248 and 249, shown in FIG. 25, are slidably mounted. Secured to and carried by the plate 248 is a housing of a limit switch 250 and secured to plate 249 is a second housing of a second limit switch 251.

Each of the limit switch housings is formed with a tubular extension 253 in which is journaled a stub shaft 254, the respective stub shafts being provided with arms 255 and 256. The arm 255 carries a roller 257 and the arm 256 carries a similar roller 258. As shown in FIG. 24, the rollers are disposed in the longitudinal path of traverse of a cam or projection 260 mounted on the C-shaped clamp 232. The projection 260 is of generally V-shaped configuration and is arranged whereby reciprocation of the clamp 232 by the hydraulic actuator 220 alternately engage the rollers 257 and 258 to actuate the limit switches 251 and 250.

The limit switches are electrically connected with the solenoid operated fluid reversing valve means 404, shown in FIG. 26, to effect successive changes in direction of the piston and piston rod 225. The area of the piston 226 of the actuator 220 at the free end is twice the area of the rod end as the cross-sectional area of the piston rod 225 within the cylinder is one-half the cross-sectional area of the cylinder bore. The solenoid control valve 404 is connected only with the fluid inlet tube 227 at the left end of the cylinder 221 as viewed in FIG. 23.

When oil under pressure flows through the solenoid control valve 404 to the left end of the cylinder 221, as viewed in FIG. 23, against the free end of the piston 226, the force is twice that of the oil pressure on the rod end of the piston, and the oil at the right side of the piston is forced back into the supply by reason of the differential areas of the piston.

When the solenoid flow control valve 404 is actuated by limit switch 250 to cause the piston to move in a left-hand direction as viewed in FIG. 6, the solenoid control valve is arranged to provide for free flow of oil out of the cylinder through the tube 227 and returned to the reservoir 360, shown in FIG. 26.

The limit switches 250 and 251 mounted by the slidable plates 248 and 249 are adapted, during the winding of a package, to be moved toward each other in order to progressively shorten the lengthwise distribution of the strands on the collectors to form tapered ends in the packages. The cover portion 210 of the housing 146 supports a headed stub shaft 264 upon which is journaled a pinion or gear 266. The plates 248 and 249 are respectively provided with racks 268 and 270 meshing with diametrically opposed regions of the pinion 266.

Through this arrangement, movement of one of the plates effects a corresponding movement of the other plate in the opposite direction. Mounted upon the left-hand end of the housing section 209', as viewed in FIG. 24, is a hydraulic actuator 272, the cylinder of which is connected with fluid conveying tubes 273 and 274 opening into the opposite ends of the cylinder. Slidably mounted in the cylinder is a piston 276 mounted upon a piston rod 277.

The plate 249 carrying the limit switch 251 is provided with a depending member 280 having a threaded bore to receive a threaded end 278 of the piston rod 277 to establish operative connection between the plate 249 and piston rod 277.

When the piston 276 is moved in a right-hand direction as viewed in FIG. 23, the plates 249 and 248 and the limit switches carried thereby will be moved toward each other, and the longitudinal distance traversed by the oscillator carrier support 144 is progressively shortened, thus reducing the longitudinal travel of the oscillators and the lengthwise area of distribution of the strands on the collector tubes.

The initial position of the piston 276 in the left-hand end of the cylinder 272 is determined by an abutment screw 282 threaded into the end of the cylinder. This adjustment determines the maximum lengthwise distribution of the strands on the collectors. An adjustable flow control valve 464 of conventional construction, shown in FIG. 26, is preferably connected with the tube 273 to "meter" the oil entering the left end of the actuator cylinder, as viewed in FIG. 23, at the rate desired to build a particular taper at the ends of the strand packages.

At the start of the formation of strand packages, the limit switches 250 and 251 are in the approximate positions illustrated in FIG. 23. During winding of the strands upon the collectors, the fluid under pressure entering through the tube 273 into the cylinder of actuator 272 moves the piston 276 in a right-hand direction at a constant rate dependent upon the adjustment of the flow control valve 464.

The arrangement is inclusive of means effective at the completion of a strand package to provide for additional movement of the carrier 74', bar 144 and oscillators 80' in a right-hand direction as viewed in FIGS. 17, 18, 21 and 23 to move the strands to strand-transfer positions adjacent the right-hand end regions of the collectors carrying the completed packages while maintaining the strands in the grooves 108 of the oscillators 80' to transfer the strands from the completed packages 55' on the collet 43' to the empty collectors or tubes 54' mounted on the collet 42', shown in FIGS. 15 through 18.

Mounted on the end wall 212, shown in FIG. 23, is a limit switch 290 equipped with an actuating plunger 292 adapted to be engaged by member 240 at the completion of strand packages. The limit switch 290 is indicated on the circuit diagram, FIG. 29, as LS5. As hereinafter explained in reference to the control circuits, a timing means renders the limit switch 250 temporarily ineffective to actuate a solenoid operated hydraulic valve so that when strand packages 55' are completed the piston rod 225, piston 226 and member 240 continue movement in a right-hand direction until the member 240 engages the plunger 292 of the microswitch 290. The microswitch 290 (LS5) is in circuit with the hydraulic pump motor M5, shown schematically in FIG. 29, and serves to de-energize the motor M5 to stop the pump and thereby stop rotation of the oscillator motor 152 and the oscillators 80' at strand transfer positions. The timing controls and resumption of operation of the hydraulic pump motor M5 will be described in connection with the description of the circuits shown in FIGS. 28 and 29.

It is essential during a winding operation in order to maintain a constant linear speed of the strands to modulate the speed of the collet upon which the packages are being formed so as to progressively reduce the collet or spindle speed as the strand packages enlarge in diameter. It is also desirable that the speed of rotation of the oscillators 80' be maintained at a substantially fixed ratio with respect to the speed of the spindle or collet upon which packages are being formed in order to maintain a proper high frequency oscillating traverse of the strands to effect a substantially uniform angular positioning or crossing pattern of the wraps of strands as they are are collected in the packages.

Hydraulic means are provided for controlling a progressive reduction in the spindle speed and for progressively reducing the speed of rotation of the traverse oscillators, these means being schematically illustrated in the hydraulic circuit or system diagram illustrated in FIG. 26. With particular reference to FIG. 26, which schematically illustrates the hydraulic system, operating components and controls, there is shown a tank or reservoir 360 containing a supply of oil for operating the various components. In the hydraulic system, a pump construction is employed for simultaneously establishing different oil or fluid pressures which are utilized for purposes hereinafter explained.

The high pressure pump section indicated at 364 receives oil from the tank 360 through a pipe 365 and the low pressure pump section indicated at 368 receives oil from the tank 360 through the pipe 365. The high pressure outlet line of pump section 364 is designated 370 and the low pressure pump outlet line designated 372.

A relief valve 374 by-passes the high pressure pump section 364, and is adjustable to vary the pressure established by the pump in the high pressure line 370. A similar relief valve 376 by-passes the pump section 368 and is adjustable in order to vary the pressure established in the low pressure line 372. While the pressures of the pumps may be varied by modifying the adjustments of relief valves 374 and 376, a high pressure of approximately twelve hundred pounds per square inch and a low pressure of approximately five hundred pounds per square inch have been found satisfactory in operating components of the winding apparatus.

An oil return line 380 is provided for all of the hydraulic components for returning oil to the tank 360. The oil return line passes through a heat exchanger 382 and thence through a pipe 384 into an oil filter 386 and through an outlet 387 into the reservoir 360. The hydraulic circuit includes restricted orifices or metering orifices controlled by needle valves, and the filter 386 removes foreign particles in the liquid or oil so as not to impede the proper metering of the oil.

The heat exchanger 382 is preferably of the water cooled type embodying a water jacket 388 supplied with water from a supply through pipe 390. A valve 392 is provided in the water supply pipe 390 to manually regulate the flow of water through the heat exchanger jacket 388 to an outlet pipe 394. A solenoid operated valve 396 is arranged in the water supply line 390 by-passing the manually operated valve 392.

The solenoid of valve 396 is in circuit with a thermostat 398 disposed to be influenced by the temperature of the oil or liquid in the tank 360. If the temperature of the oil exceeds a predetermined value, the thermostat 398 activates the solenoid operated valve circuit to open the valve to increase the flow of water through the heat exchanger 382. Oil may be introduced into the system through an inlet port 400 provided with a check valve 401.

The solenoid operated valve 404 is operable to admit oil at high pressure into the cylinder to act upon the free area of the piston 226 to secure movement thereof in one direction, and alternately to establish a connection with the return oil line 380 when the traverse carrier 74' moves in the opposite direction. The pipe 227 opening into one end of the cylinder of actuator 220 is connected through a manually controlled needle valve 406 and a pipe 407 with the valve 404.

A check valve 408 by-passes the manually adjustable valve 406, the check valve providing flow of oil through pipe 407 past the check valve and through the tube 227 into the cylinder but preventing return flow of oil past the check valve. Through this arrangement the adjustable valve 406 on an operative stroke of the piston 226 in one direction meters or restricts the oil so as to control the speed of traverse in the said one direction. The valve 404 is arranged to alternately connect the pipe 407 by means of a pipe 410 with a high pressure line 370, or through a pipe 412 with the oil return line 380.

The opposite end of the cylinder or actuator 220 is connected by means of a pipe 228 with the high pressure oil line 370 through an adjustable needle valve or metering valve 414 for metering the flow of oil under high pressure through the tube or pipe 227 from the rod end of the cylinder for moving the traverse carrier 74' in the opposite direction. A check valve 416 is arranged in a by-pass around the metering valve 414 to prevent reverse flow of oil from the pipe 228 through the by-pass to the high pressure line 370.

This arrangement provides for flow of oil through the check valve 416 and through the tube 228 into the cylinder 220 but restricts flow of oil in the opposite direction so that oil flow in the opposite direction must be "metered out" through the metering needle valve 414.

It will be apparent that when the valve 404 is moved by solenoid mechanism to connect the pipe 410 with the pipe 407, the oil flow through pipe 227 into the one end of the cylinder is against the full area of piston takes place through the one way check valve 408 or through the metering needle valve 406 into the cylinder.

The pressure acting up the full area of the piston in the cylinder 220 moves the piston rod 226 in a left-hand direction as shown in FIG. 26, viz in a right-hand direction as viewed in FIG. 23. During this period of high pressure acting upon the large area of the piston 226 and, due to the differential area of the rod end of the piston, oil flows away from the cylinder through the tube 228 and the metering needle valve 414 so that the oil is "metered out" from the cylinder through the needle valve 414 into the high pressure oil line 370.

The valve 414 is manually adjustable to control the effective restriction and thereby control the rate of movement of the piston 226 and the traverse carrier 74'. When the valve 404 is moved by its solenoid so as to establish communication between pipe 407 and the return pipe 412, oil under high pressure from the line 370 passes through the metering valve 414 and the check valve 416 through pipe 228 into the rod end of the actuator 220 thus moving the piston therein in a right-hand direction as viewed in FIG. 26, viz a left-hand direction as viewed in FIG. 23.

During this movement of the piston, oil flows away from the cylinder through the pipe 227 and is "metered out" by the metering needle valve 406 into the return line to the reservoir 360. The check valve 408 prevents reverse flow of oil from pipe 227 into pipe 407 so that the oil flowing out through pipe 227 is restricted by the metering needle valve 406 thus establishing the rate of movement of the piston 226 and the traverse carrier 74' in the opposite direction. The solenoids of the valve 404 are actuated by the operation of the limit switches 250 and 251 shown in FIG. 23, and their relative positions control the extent of movement of the traverse carrier 74'.

The hydraulically actuated motor 152 rotating the oscillators 80' is arranged to be varied in speed during a winding operation in proportion to the rate of reduction in speed of a collector tube as the package of strand builds up to an enlarging diameter. In the embodiment illustrated, the speed of the motor 152 is controlled by dual valve means 418 and 420. The flow control valve 418 is manually adjustable to provide the required speed of rotation of the traverse oscillators at the start of a winding operation the other valve 420 being cam controlled or adjusted to modulate the oscillator speed at a substantially fixed ratio with respect to the speed of the collet and collectors upon which the strands are being wound.

The flow control valves 418 and 420 are connected with the high pressure oil line 370 and the inlet pipe 178 of the motor. The cam operated valve 420 is controlled by a hydraulic actuator 422 comprising a cylinder containing a piston 423 connected with a piston rod 424 equipped with a cam 425. The cam 425 cooperates with a follower 426 which is connected with an adjusting member of the valve 420 to regulate the latter upon movement of the cam 425 by the actuator 422.

A solenoid controlled valve 434 shown in FIG. 26 is interconnected with both high and low pressure oil lines. The solenoids 435 and 436 of the valve mechanism 434 are connected with cycle timers of the programming arrangement hereinafter described. The solenoid controlled valve 434 controls the direction of movement of the piston 438 of a fluid actuator 440, the piston 276 of the actuator 272, and the piston 423 of the actuator 422.

The hydraulic actuator 440 is arranged to control the speed of the spindle or collet upon which a strand package is being formed. The piston rod 441 is connected by means of rack and pinion mechanism 534, 533, shown in FIG. 27, for operating potentiometers 532 and 562 forming components of the electrical control circuits for modifying reference voltages to modulate the speed of the electrically energized motor of each of the spindles or collets for reducing the speed of a winding collet as the strand packages increase in size in order to maintain substantially constant the lineal travel of the strands of filaments as they are being collected.

The fluid actuators 440, 272 and 422 are associated with valve mechanisms for restricting or metering the high pressure oil flow to the cylinders of the actuators whereby the pressure is effective against the large area regions of the actuator pistons. Arranged in the high pressure oil line 370 and in advance of the valve means controlling the actuators 440, 272 and 422 is a filter 444 to assure that the oil is free of foreign particles so as not to impair or block the operation of the metering valves for restricting oil flow to the hydraulic actuators.

During the building of strand packages upon rotating collectors the solenoid controlled valve 434 is positioned whereby the oil in the low pressure line 372 flows through the valve 434 directly to the return line 380 thence into the reservoir 360. Arranged between the pipe 446 leading into the end of the actuator cylinder of the actuator 440 and the high pressure oil line 370 is a manually adjustable flow control valve 448 for metering high pressure oil into the cylinder, and a check valve 458 to allow free flow of oil in the opposite direction. A drain line 456 is connected between valve 448 and the return line 380.

Pipes 450, 274 and 478 connect the rod ends of the cylinders of actuators 440, 472 and 422 respectively with the oil return line 380. A check valve 460 is arranged in a portion of the return line 380 as shown in FIG. 26 to prevent back pressure building up in the return line, and to facilitate rapid flow of oil into the rod ends of the cylinders of actuators 440, 472 and 422 respectively with resetting of the actuators.

A pressure relief valve 462 by-passes the check valve 460 to maintain a back pressure in the portion of the return line 380 connected with the rod ends of the actuators 440, 272 and 422 as oil is metered into pipes 446, 273 and 472.

Metering valve means is provided for regulating the flow of high pressure oil from line 370 into the large end of the hydraulic actuator 272 to control the rate of movement of the piston 276 and thereby control the taper build-up of the strand packages by varying the positions of the limit switches 250 and 251, shown FIG. 23. The regulating means including a manually adjustable metering valve 464 are disposed between the high pressure oil line 370 and the pipe or tube 273.

A check valve 466 is arranged in parallel with the manually adjustable valve 464 to permit free flow of oil out of the free piston end of the actuator 272 during resetting operations. A drain line 467 is connected between the valve 464 and the oil return line 380.

The metering valve 464 is adjustable to regulate flow of oil under high pressure into the large end of the actuator 272 at a rate to slowly but constantly move the limit switches 250 and 251, through the rack and pinion mechanism shown in FIG. 25, toward each other to progressively shorten or reduce the lengthwise distribution of the strands on the collectors. If a steep taper is desired at the package ends, the valve 464 is adjusted to a low rate of flow of oil into the large end of the actuator, if a more gradual and longer taper is desired at the package ends the valve 464 is adjusted to increase the flow of oil into the actuator.

A manually adjustable metering valve 470 is disposed between the high pressure oil line 370 and the pipe 472 at the large end of the actuator cylinder 422. The metering valve 470 regulates the flow of oil under high pressure into the cylinder 422 acting against the piston 423 to move the piston rod 424 and cam 425 to vary the position of the cam follower 426 and valve 420 for varying the speed of rotation of the oscillator traverse motor 152. A check valve 474 is in parallelism with the adjustable metering valve 470 to provide for free flow of oil away from the cylinder during resetting operations.

FIGS. 27, 28 and 29 illustrate schematically the electric control and activating circuits for various operating components of the winding apparatus of FIGS. 15, 17 and 18 for effecting the operations or steps of the method and their proper sequence providing for automatic operation in winding successive pairs of strand packages without interruption of filament attenuation, maintaining substantially constant the lineal travel of the strands during package forming operations.

The speed of the collet operating motors 44a and 44b when in winding position, viz the position of motor 44b which drives the collet 43' during winding operation at the position indicated at FIG. 15, is controlled to compensate for the enlarging diameter of the packages during winding operations. With particular reference to FIG. 27, a constant speed, electrically energized motor 491 provides a drive for a rotor 492 of an eddy current clutch 494.

The eddy current clutch 494 includes a driven rotor 496, the torque being transferred from the rotor 492 to the rotor 496 by magnetic flux. The driven rotor 496 directly drives the armature of a high frequency alternator or generator 498 of a character whereby the frequency of the current generated by the alternator 498 varies with its speed of rotation. The three phase variable frequency current from the alternator 498 is utilized for driving the collet rotating motors 44a and 44b which respectively rotate the collets 42' and 43 shown in FIGS. 15 through 18.

The circuits for the collet driving motors are controlled by control relays and switch means hereinafter described and shown schematically in FIGS. 28 and 29. The relay actuating circuits for the motors 44a and 44b are components of a master controller or programmer 510 shown in FIG. 27. The control arrangement includes a package timer 512 which is adjustable and determines the duration of winding of the strand packages at the winding station. The control functioning of the timer 512 will be hereinafter described in connection with the operation of the winding apparatus. The hydraulically actuated components and the control relays and switch means are generally of the character disclosed in Pat. 3,109,602.

The shaft 516 driving the alternator 498 also drives a tachometer generator 518 which impresses voltage through a rectifier 520 to a voltage summating means or differential amplifier 526. An energizing coil 522 for the eddy current clutch 494 is supplied with direct current through a Thyratron electronic control means 524, the control 524 being supplied with alternating current derived from supply lines L1 and L2. The Thyratron control 524 is connected with the voltage summating means or differential amplifier 526.

The control circuit for the tachometer generator 518 includes a current supply from supply lines L3 and L4. This circuit includes fixed and adjustable resistances 528 and 530 respectively and a potentiometer 532 for varying the voltage range supplied to the differential amplifier 526. The movable arm of the potentiometer 532 is driven by a pinion 533 enmeshed with a rack 534 associated with and actuated by the piston rod 441 of the hydraulic actuator 440, shown in FIG. 26.

Through the medium of the potentiometer 532 which is operated by actuator 440, a variable voltage is supplied through leads 538 and 540 to the differential amplifier 526. The differential amplifier 526 summates the voltage from the Thyratron control 524 with the reference voltage supplied through the potentiometer 532 constituting the input for the control 524. The control 524 regulates the strength of the current supplied to the coil 522 to vary the degree of slip of the eddy current clutch 496 and thereby vary the speed of the alternator 498.

The voltage of the tachometer generator circuit normally maintains constant the current in the current coil 522 through the Thyratron control 524 to maintain the alternator 498 at a substantially constant speed. Hence, a change in the voltage supplied to the Thyratron control 524 from the potentiometer 532 through the differential amplifier 526 modifies the current supplied to the coil 522 of the coupling 496. To obtain a proper summated voltage to the Thyratron control, the circuit of the tachometer generator is of a negative potential and the circuit of the potentiometer 532 is of a positive potential.

A small transformer 542 is connected across one phase of the three phase generator output and is arranged to provide a secondary or sample voltage which is proportional to the generator output voltage. This voltage of the small transformer is rectified and filtered by a second voltage summating means or differential amplifier 544 in the same manner as the voltage set up in the tachometer generator 518.

The rectified sample voltage is compared with the reference voltage of the proper magnitude supplied by a second potentiometer 562 driven by the pinion 533 to the differential amplifier 544, and the differential between the sample voltage provided by the transformer 542 and the reference voltage provided through the potentiometer 562 is utilized to control the direct current output of an electronic exciter 546 for the high frequency alternator 498, the direct current output controlling the output voltage of the high frequency alternator 498.

The movable components or arms of the potentiometers 532 and 562 are reset or correlated at the start of winding of the dual packages by the flow of oil under pressure into the actuator 440 metered to drive the potentiometers to thereby vary the current supplied to the direct current coil 522 of the eddy current clutch 496 and the output voltage of the alternator 498. By varying the current supplied to the current coil 522, the magnetic flux in the slip clutch 496 is varied during package forming operation and thereby effects a corresponding variation in the speed of the alternator or generator 498 even though the motor 490 rotates the rotor component 492 of the slip clutch by a substantially constant speed.

The drive speed control provided by the eddy current clutch and its controls is correlated with the voltage output of the alternator 498 provided by the electronic exciter 546 so that the speed of the collet driving motor at the winding station may be progressively reduced as the strand packages increase in size.

FIGS. 28 and 29 illustrate the circuits of the various electrical controls of the programming arrangement for initiating and activating components of the automatic winding apparatus in their proper sequence of operation. FIG. 29 is a continuation of the circuit arrangement of FIG. 28 and reference to the various control components in the circuits will be made in connection with the description of the operation of the apparatus.

The following description of the operation of the apparatus is premised upon an initial starting of the automatic winding apparatus, the operations being automatic after an initial start up.

In initiating the operation of the apparatus, the operator first closes the control power switch 550 illustrated in FIG. 28. The operator places two collectors or packaging tubes on each of the motor driven collets 42' and 43', the collet 43' being illustrated at the winding station in winding position. The operator then closes the motor-generator starting switch 552 which energizes the motor control unit for the motor 491 of the motor-generator or alternator 490 illustrated schematically in FIG. 27.

In initial condition, the control relay CR1 is energized through the normally closed contacts of the timer T3-2. The contacts T2-5 are closed to complete an energizing circuit across the limit switch LS5 to actuate the hydraulic pump motor M5. The solenoid 435 of the hydraulic control valve 434 is de-energized through the normally closed contacts of the control relay CR1-1. The solenoid 436 of the valve means 434 is energized through the contacts of control relay CR1-2, this setting of the control valve directing oil under pressure into the rod ends of the hydraulic actuators 440, 272 and 422 to reset the actuators by moving the pistons in right-hand directions as viewed in FIG. 20 toward the large ends of the cylinders, the oil in the right-hand ends of the cylinders being returned to the reservoir 360 through the return line 380 provided by the connection established through the valve means 434.

The four cam operated limit switches CLS–1, CLS–2 and CLS–4 are driven by a chain and sprocket means (not shown) from a turret operating shaft (not shown). The control relay CR9 is energized through the cam limit switch CLS–1 and the normally closed contact of control relay CR11–4.

The operator depresses the foot-operated switch 554 shown in FIG. 28 and the following conditions are established: Control relay CRES is energized through normally closed contacts CR6–1, and is sealed in or held in this position through the contacts of the control relay CRES–2. The contacts of the control relay CRES–1 close but while the operator maintains the foot switch 554 depressed, control relay CR2 is not energized.

The operator releases pressure on the foot switch 554. With the foot switch in release position, the relay CR2 is energized through the contacts of control relay CRES–1 and the normally closed contact of control relay CR4–1. The running starter M1R, shown in FIG. 29 for the drive motor 44a for the collect 43' at the winding position is energized through the relay contacts CR2–2 and CR9–1.

The collet 43' will start to rotate and the operator wraps the dual strands around the end region of the collet 43'. After a small amount of the strands is wound on the collet 43', the operator then engages the strands with oscillators 80'. During the period of time that the collet driving motor 44a is increasing in speed, the following conditions exist in the circuits.

The control relay CR3 is energized through contacts CR2–1 and is held in or seals in through the relay contacts CR3–1. The hydraulic pump motor control M5, shown in FIG. 29, is energized through contacts CR3–3 and through contacts T2–5. The forward motion of the traverse carrier 74' and its supporting bar 144 is controlled by the limit switch 250 and the rearward movement thereof controlled by the limit switch 251. The control relay CR4 and the time delay relay TDR1 are energized through relay contacts CR3–2.

The start up timer TDR1 is on delay. The contacts of relay CR4–1 open, de-energizing control relay CR2 which causes a momentary operation of this control relay. The motor starting timer T1 and the package timer T2 are energized through contacts of the time delay relay TDR1–1, relay contacts CR4–2 and the normally closed contacts CR5–1. The relay contacts CR4–6 take over the duty of the relay contacts CR2–2 since the control relay CR2 was de-energized when control relay CR4 become energized.

The contacts CR4–5 are closed but the motor control M3S for the motor 44b adapted to drive the standby spindle 42' which is subsequently to be moved into winding position, is not rotated since the timer T1–2 is time closed. The contacts CR4–4 are closed, but since the contacts of CR12–2 are open, the control relay CR5 is not energized. The reset timer T3 for overriding the switch 250 energized through timer contacts T2–3 and T2–5 momentarily closes at start of T2 to start the pump motor M5.

After a predetermined period, timer contacts T3–2 open, de-energizing the control relay CR1. The relay contacts CR1–2 open de-energizing the solenoid 436 of the valve means 434.

The relay contacts CR1–1 return to normally closed position, energizing the solenoid 435 of the valve means 434 to reset and bring into operation the fluid actuator 440 for controlling the collet speed and the traverse carrier control actuator 272 for building the tapered ends in the strand packages, and the actuator 422 for controlling the speed of rotation of the oscillators 80'.

The potentiometers 532 and 562 are set into operation by the rack and pinion mechanism actuated by the fluid actuator 440 providing the varying voltages for influencing the speed of the alternator 498 and its output voltage and frequency for progressively reducing the speed of the motor driving a winding collet at the winding station as the strand package increase in size. The winding of the strands at the winding station continues until the desired package size is attained.

During the winding of the packages, the oil under high pressure, admitted to the end of the actuator 272 through the tube 273 controlled or metered by the metering valve 464, moves the piston 276 slowly in a right-hand direction as viewed in FIG. 23 which through the rack and pinion arrangement shown in FIGS. 23, 24 and 25 continuously shifts the positions of the limit switches 250 and 251 to gradually shorten the lengthwise distribution of the strands on the packages to build the tapered ends. The movement of the limit switches 250 and 251 toward each other shortens the successive strokes of the piston rod 225 of the actuator 220 and correspondingly reduce successive strokes of the traverse carrier 74' and its supporting rod 144.

The speed of rotation of the strand traverse oscillators 80' is modulated as the packages increase in size. As the piston 423 in the fluid actuator 422 is moved by oil under pressure metered through the valve 470, shown in FIG. 26, the cam 425 carried by the piston rod 424 of actuator 422 moves the cam follower 426 which mechanically varies the metering or degree of restriction of the hydraulic control valve 420 to gradually reduce the speed of rotation of the oscillators by reducing the speed of the oscillator driving motor 152 by reducing the rate of flow of oil under pressure to the motor.

When the desired size of package has been wound, the following actions occur in effecting transfer of the strands automatically to empty sleeves or collectors moved into position at the winding station. Just prior to the packages attaining their full size, the timer contacts T1–2 close which energizes the motor 44b to initiate rotation of the collet 42' carrying the empty sleeves or collectors 54' to rotate the sleeves at the same speed as the sleeves bearing completed packages preparatory to the indexing of the turret 40'.

The reduced voltage transformer 543, shown in FIG. 27, is brought into the circuit of motor 44b which is in sequence for indexing into the winding position. The motor 44b during starting operates on reduced voltage through the transformer TR2 for a preset period of time through motor starter contact M3S.

When the packages 55' have reached full size as determined by the timer (512) T2, timer contacts T2–4 open to render ineffective the limit switch 250. The carrier 74' and oscillators 80' continue movement in a right-hand direction, as viewed in FIGS. 17, 18, 21 and 23, under oil continuing to flow into the piston end of the cylinder 221 until the plunger 292 of limit switch 290 (LS5) is engaged by member 240 opening the contacts to de-energize the pump motor M5.

The timer contacts T2–2 close, energizing the turret indexing motor 46a. The indexing motor 46a rotates the turret 40' through one-half of a revolution shifting the relative positions of the collets 42' and 43' in a clockwise direction as viewed in FIG. 15, moving the completed packages 55' of strand to the position previously occupied by the collet 42', and moving the collet 42' carrying the empty sleeves into winding position previously occupied by the collet 43'.

As the indexing operation is started, the cam limit switch CLS4 is closed, energizing the relay contacts CR12. The index motor 46a is held in circuit through relay contacts CR12–1. The contacts CR12–2 are closed energizing the control relay CR5 and the delay timer TDR2 which controls direct current brake force applied to motor 44a to reduce the speed of the collet 43' carrying the completed packages. The normally closed relay contacts CR5–1 open, de-energizing the motor starting timer T1 and the timer T2 being the package size control. This action allows both timers to reset.

The timer contacts T1–2 open, de-energizing motor starter control M3S. The timer contacts T2–3 open, de-energizing the reset timer T3. At the instant the reset timer T3 is de-energized, the control relay CR1 is energized through the normally closed contacts of the timer contacts T3–2.

The solenoid valve 435 is de-energized through the normally closed contacts of control relay CR1–1. The solenoid valve 436 in the hydraulic system is energized through relay contacts CR1–2. This action resets the hydraulic actuators 440, 272 and 422 preparatory to the next automatic winding cycle.

At the same time that the turret 40' is indexed to bring the collet 42' into winding position, the cam operated limit switch CLS–1 opens, de-energizing the control relay CR9. The relay contacts CR9–1 and CR9–2 open, de-energizing control M1R to disconnect the circuit to the motor 44a and de-energizing the control M3S which applies reduced voltage to the motor 44b during starting thereof. The cam operated limit switch CLS–2 closes to energize the control relay CR10 through the normally closed relay contacts CR9–4.

The control M3R for applying full voltage to the motor 44b of the spindle 42' in winding position is energized through contacts CR10–1. The motor braking control M1B for the motor 44a, now moved away from winding position carrying full packages of strand, is energized through time delay relay contacts TDR2–1 and contacts CR10–3. The brake control M1B supplies direct current braking power to motor 44a as it moves away from winding position.

As the collet 42' carrying the empty sleeves or tubes is moved toward the winding station and is rotating at the speed of the collet 43' bearing the completed packages and, as the collet 43' is rapidly slowing down under the influence of the braking forces provided by the direct current braking power applied to the motor 44a, slack regions in the strands occur between the empty sleeves 54' on the collet 42' and the completed packages which have moved away from the winding station.

The slack regions of the strand are adjacent the peripheries of the end regions of the empty sleeves on the collet 42', and allow the strands to adhere or "lick" to the peripheries of the empty sleeves whereby initial winding of the strands on the empty sleeves is begun.

The strands adhering to the empty sleeves and the initial convolutions are snubbed by succeeding convolutions or wraps setting up tension in the regions of the strands between the completed strand packages and the initial strands on the empty sleeves causing the strands to break or fracture between the completed packages and the empty sleeves, thus freeing the completed packages which are being brought to rest by the DC current braking forces applied to the motor 44a by the control M1B.

When the indexing operation performed by the indexing motor 46a is completed, the cam limit switch CLS–4 opens de-energizing control relay CR12. The contacts CR12–2 open, de-energizing the time delay relay TDR2 and the control relay CR5. Contacts CR12–1 open, de-energizing the indexing motor 46a.

The motor starting timer T1 and the package timer T2 are energized through normally closed contacts CR5–1, and the timers T1 and T2 are held energized or sealed in through contacts T1–1 and T2–1.

The contacts T2–3, which are normally timed open, are closed energizing the reset timer T3, and contacts T2–5 are closed momentarily to energize the pump motor M5 until the oscillator carrier moves into the influence of the switches 250 and 251. Contacts T3–2 open, de-energize control relay CR1. The contacts CR1–2 open, de-energizing the solenoid 436 of valve means 435. The solenoid 435 of the valve 434 is energized through normally closed contacts CR1–1.

Time delay relay contacts TDR2–1 open, de-energizing the brake current control M1B to interrupt the direct current breaking force from the motor 44a which is out of winding position and its rotation ceases. The cycle of operations is repeated during the winding of strands upon the sleeves 54' on the spindle 42' now in the winding position and in subsequent winding operations.

In normal operations, the operator now removes the completed packages from the collet 43' which is at rest and telescopes empty sleeves or tubes onto the collet 43'.

The controls M3S and M3R control the starting and running of the motor 44b through the associated relays shown in FIGS. 28 and 29 in the same manner that the collet motor 44a is controlled. The control M3B, through its associated relays, impresses direct current braking forces to the motor 44b when the collet driven thereby is indexed out of winding position.

Through this arrangement the strands are at all times maintained in the control grooves 108 in the oscillators 80' and are guided onto the end regions of the package collector tubes during transfer of the strands from completed packages onto empty collector tubes. With the pump motor M5 de-energized when the oscillators are in strand-transfer position, the strands are not oscillated and are wound on the end regions in paths defined by the grooves in the nonrotating oscillators. Oscillation of the strands is resumed when the pump motor M5 is again energized to supply fluid under pressure to the oscillator motor 152.

It is apparent that, within the scope of the invention, modifications and different arrangements may be made other than as herein disclosed, and the present disclosure is illustrative merely, the invention comprehending all variations thereof.

We claim:

1. Apparatus of the character disclosed, in combination, a frame, an indexible head journaled on the frame, a plurality of winding collets mounted by said head, driving means individual to each collet for rotating the same, each of said collets being arranged to receive and support a collector upon which a strand of filaments is wound to form a package, said head being indexible to successively move a collet and collector to a winding station, motive means for indexing the head, means for distributing the strand on the collector at the winding station including a carrier reciprocable lengthwise of the collector at the winding station, a rotatable strand oscillator mounted by the carrier for oscillating the strand during its collection in forming a strand package, an electrically energizable motor of the variable speed type for rotating the oscillator, a variable speed motor individual to each winding collet for rotating the winding collet, means for concomitantly varying the speeds of the oscillator motor and a collet motor including a pair of variable frequency generators, the output frequencies of the generators being modulated as a strand package at the winding station increases in size, the output from one generator energizing a collet driving motor and the output of the other generator energizing the oscillator motor, the frequencies of the generators being modulated to maintain substantially constant the rate of linear travel of the strand and effect a proper crossing of the individual wraps of strand in the package.

2. Apparatus of the character disclosed, in combination, a frame, an indexible head journaled on the frame, a plurality of winding collets mounted by said head, driving means individual to each collet for rotating the same, each of said collets being arranged to receive and support a collector upon which a strand of filaments is wound to form a package, said head being indexible to successively move a collet and collector to a winding station, motive means for indexing the head, means for distributing the strand on the collector at the winding station including a carrier reciprocable lengthwise of the collector at the winding station, a rotatable strand oscillator mounted by the carrier for oscillating the strand during its collection in forming a strand package, an electrically energizable motor of the variable speed type for rotating the oscillator, a variable speed motor individual to each winding collet for rotating the winding collets, means for concomitantly varying the speeds of the oscillator motor and a collet motor including a pair of variable frequency generators, power transmission means connecting the generators whereby one is driven by the other at a fixed ratio, said generators being driven at varying speeds as the strand package at the winding station increases in size, the output from one generator energizing a collet driving motor and the output of the other generator driving the oscillator motor whereby to maintain substantially constant the rate of linear travel of the strand and effect a proper crossing of the individual wraps of strand in the package.

3. Apparatus of the character disclosed, in combination, a frame, an indexible head journaled on the frame, a plurality of winding collets mounted by said head, driving means individual to each collet for rotating the same, each of said collets being arranged to receive and support a collector upon which a strand of filaments is wound to form a package, said head being indexible to successively move a collet and collector to a winding station, means for distributing the strand on the collector at the winding station including a carrier reciprocable lengthwise of the collector at the winding station, a rotatable strand oscillator mounted by the carrier for oscillating the strand during its collection in forming a strand package, an electrically energizable motor of the variable speed type for rotating the oscillator, a variable speed motor individual to each winding collet for rotating the winding collets, means for varying the speeds of the oscillator motor and a collet motor including two outputs of electric energy of variable characteristics, one output of energy energizing the collet driving motor, the other output of energy energizing the oscillator motor, the characteristics of the outputs of electric energy being varied as the strand package increases in size whereby to maintain substantially constant the rate of linear travel of the strand and effect proper crossing of the individual wraps of strand on the package.

4. Apparatus of the character disclosed, in combination, a frame, an indexible head journaled on the frame, a plurality of winding collets mounted by the head, means providing a current having variable characteristics, a variable speed motor individual to each collet for rotating the same, said motors being energized by the current, each of said collets being arranged to receive and support a collector upon which a strand of filaments is wound to form a package, said head being indexible to successively move a collet and collector to a winding station, motive means for indexing the head, means for distributing the strand on the collector at the winding station including a reciprocable carrier, a rotatable strand oscillator mounted by the carrier for oscillating the strand during its collection in forming a strand package, an oscillator drive motor of the variable speed type arranged to rotate the oscillator, said oscillator drive motor being energized by the current, and means for modulating a variable characteristic of the current as the strand package at the winding station increases in size to vary the speed of the collet drive motor and to vary the speed of the oscillator drive motor while maintaining constant the ratio of the speed of the collet at the winding station to the speed of the strand guiding surface.

5. Apparatus of the character disclosed, in combination, a frame, an indexible head journaled on the frame, a plurality of winding collets mounted by the head, a variable speed motor individual to each collet for rotating the same, each of said collets being arranged to receive and support a collector upon which a strand of filaments is wound to form a package, said head being indexible to successively move a collet and collector to a winding station, motive means for indexing the head, means for distributing the strand on the collector at the winding station including a reciprocable carrier, a rotatable strand oscillator mounted by the carrier for oscillating the strand during its collection in forming a strand package, an oscillator drive motor of the variable speed type arranged to rotate the oscillator, a current supply instrumentality of the variable voltage type, means for modulating the voltage of the current supply as the strand package at the winding station increases in size for varying the speed of the collet drive motor at the winding station and for varying the speed of the oscillator drive motor.

6. The method of continuously forming and collecting filaments of heat-softenable material in wound packages including flowing a group of streams of the material from a supply, rotating a first variable speed electric motor by a variable characteristic current, rotating a strand collector by the first variable speed motor, guiding the strand by a rotatable surface to effect a crossing of convolutions of strand as it is wound on the collector, rotating a second variable speed electric motor by the variable characteristic current for driving the rotatable strand guiding surface, and modulating the variable characteristic of the current to progressively vary the speeds of the motors while maintaining constant the ratio of the collet speed to the speed of the strand guiding surface.

7. The method of continuously forming and collecting filaments of heat-softenable material in wound packages including flowing a group of streams of the material from a supply, rotating a first variable speed motor by a variable voltage current, rotating a strand collector by the first variable speed motor, guiding the strand by a rotatable surface to effect a crossing of convolutions of strand as it is wound on the collector, rotating a second variable speed motor by the variable voltage current for driving the rotatable strand guiding surface, and modulating the voltage of the current to progressively vary the speeds of the motors while maintaining constant the ratio of the collet speed to the speed of the strand guiding surface.

8. The method of continuously forming and collecting filaments of heat-softenable material in wound packages including flowing a group of streams of the material from a supply, rotating a first variable speed electric motor by current of variable frequency, rotating a strand collector by the first variable speed motor, guiding the strand by a rotatable surface to effect a crossing of convolutions of strand as it is wound on the collector, rotating a second variable speed electric motor by current of variable frequency for driving the rotatable strand guiding surface, and modulating the frequency of the currents to progressively vary the speeds of the motors while maintaining constant the ratio of the collet speed to the speed of the strand guiding surface.

9. The method of forming and collecting filaments of glass in wound packages including flowing a group of streams of glass from a supply, rotating a variable speed generator, rotating a first variable speed motor from the output of the generator, rotating a strand collector by the first variable speed motor to wind a strand of filaments attenuated from the streams on the collector, guiding the strand by a rotatable surface to effect a crossing of convolutions of strand as it is wound on the collector, rotating a second variable speed motor from the output of the generator for driving the rotatable strand guiding surface, and modulating a characteristic of the output of the variable speed generator to vary the speeds of the motors.

10. The method of continuously forming and collecting filaments of heat-softenable material in wound packages including flowing a group of streams of the material from a supply, rotating a strand collector by a first variable speed motor to wind the strand of filaments formed from the streams on the collector, guiding the strand by a rotatable surface to effect a crossing of convolutions of strand as it is wound on the collector, rotating the strand guiding surface by a second variable speed motor, driving the first motor by a first output of electric energy, driving the second motor by a second output of electric energy, and modulating the characteristics of the outputs of electric energy to vary the speeds of both variable speed motors as the package of strand increases in size.

11. The method of continuously forming and collecting filaments of heat-softenable material in wound packages including flowing a group of streams of the material from a supply, rotating a strand collector by a first variable speed motor to wind the strand of filaments formed from the streams on the collector, guiding the strand by a rotatable surface to effect a crossing of convolutions of strand as it is wound on the collector, rotating the strand guiding surface by a second variable speed motor, driving the first motor by the output of a variable frequency generator, driving the second motor by the output of a second variable frequency generator, and modulating the characteristics of the outputs of the generators to vary the speeds of both variable speed motors as the package of strand increases in size.

12. The method of continuously forming and collecting filaments of heat-softenable material in wound packages including flowing a group of streams of the material from a supply, rotating a strand collector by a first variable speed motor to wind the strand of filaments formed from the streams on the collector, guiding the strand by a rotatable surface to effect a crossing of convolutions of strand as it is wound on the collector, rotating the strand guiding surface by a second variable speed motor, driving the first motor by the output of a first generator, driving the second motor by the output of a second generator, and concomitantly modulating the characteristics of the output of both generators to vary the respective speeds of the motors as the package of strand increases in size.

13. The method of continuously forming and collecting filaments of heat-softenable material in wound packages including flowing a group of streams of the material from a supply, rotating a strand collector by a first variable speed motor to wind the strand of filaments formed from the streams on the collector, guiding the strand by a rotatable surface to effect a crossing of convolutions of strand as it is wound on the collector, rotating the strand guiding surface by a second variable speed motor, driving the first motor by the output of a variable frequency generator, driving the second motor by the output of a second variable frequency generator, establishing a drive of fixed ratio between the generators, and modulatng the speed of the generators to vary the characteristics of the output of the generators and thereby vary the speeds of both variable speed motors as the package of strand increases in size.

14. The method of continuously forming and collecting filaments of heat-softenable material in wound packages including flowing a group of streams of the material from a supply, rotating a strand collector by a first variable speed motor to wind the strand of filaments formed from the streams on the collector, guiding the strand by a rotatable surface to effect a crossing of convolutions of strand as it is wound on the collector, rotating the strand guiding surface by a second variable speed motor, varying the characteristics of the electric energy input to the first motor to modulate the speed of the first motor as the package of strand increases in size to maintain substantially constant the rate of travel of the strand as the package increases in size, and varying the characteristics of the electric energy input to the second motor to modulate the speed of the second motor to vary the rate of frequency of oscillations of the strand as the package of strand increases in size.

15. The method of continuously forming and collecting filaments of heat-softenable material in wound packages including flowing a group of streams of the material from a supply, rotating a strand collector by a first variable speed motor to wind the strand of filaments formed from the streams on the collector, guiding the strand by a rotatable surface to effect a crossing of convolutions of strand as it is wound on the collector, rotating the strand guiding surface by a second variable speed motor, varying the frequency of the electric energy input to the first motor to modulate the speed of the first motor as the package of strand increases in size to maintain substantially constant the rate of travel of the strand as the package increases in size, and varying the frequency of the electric energy input to the second motor to modulate the speed of the second motor to vary the rate of frequency of oscillations of the strand as the package of strand increases in size.

References Cited

UNITED STATES PATENTS

| | | |
|---|---|---|
| 3,041,662 | 7/1962 | Cochran. |
| 3,090,570 | 5/1963 | Cunningham et al. |
| 3,109,602 | 11/1963 | Smith. |

STANLEY N. GILREATH, Primary Examiner

U.S. Cl. X.R.

65—11; 242—43